US011546941B2

(12) United States Patent
Zhang et al.

(10) Patent No.: US 11,546,941 B2
(45) Date of Patent: Jan. 3, 2023

(54) RANDOM ACCESS PROCEDURE WITH CROSS BAND DOWNLINK/UPLINK PAIRING

(71) Applicant: QUALCOMM Incorporated, San Diego, CA (US)

(72) Inventors: Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 16/038,591

(22) Filed: Jul. 18, 2018

(65) Prior Publication Data

US 2019/0059110 A1 Feb. 21, 2019

Related U.S. Application Data

(60) Provisional application No. 62/547,463, filed on Aug. 18, 2017.

(51) Int. Cl.
*H04W 74/08* (2009.01)
*H04W 72/04* (2009.01)
(Continued)

(52) U.S. Cl.
CPC ......... *H04W 74/0833* (2013.01); *H04W 4/70* (2018.02); *H04W 16/14* (2013.01);
(Continued)

(58) Field of Classification Search
CPC ....... H04W 74/08; H04W 4/70; H04W 16/14; H04W 72/04; H04W 88/023
See application file for complete search history.

(56) References Cited

U.S. PATENT DOCUMENTS

2016/0029390 A1 1/2016 Ohta et al.
2019/0357264 A1* 11/2019 Yi ...................... H04L 27/2602
(Continued)

FOREIGN PATENT DOCUMENTS

| | | | |
|---|---|---|---|
| CN | 101292562 | A | 10/2008 |
| CN | 104853446 | A | 8/2015 |
| CN | 104919885 | A | 9/2015 |

OTHER PUBLICATIONS

Huawei et al., "Low frequency assisted high frequency operation on initial access", 3GPP Draft, R1-1609448, Oct. 10-14, 2016 (Year: 2016).*

(Continued)

*Primary Examiner* — Kent Krueger
(74) *Attorney, Agent, or Firm* — Holland & Hart LLP

(57) ABSTRACT

Methods, systems, and devices for wireless communication are described. A user equipment (UE) may receive, from a base station, a broadcast message comprising a first set of random access parameters for a first uplink band supported by the base station and a second set of random access parameters associated with a second uplink band supported by the base station. The UE may select one of the first set of random access parameters or the second set of random access parameters for a random access signal. The UE may transmit a random access signal over one of the first uplink band or the second uplink band using the selected one of the first set of random access parameters or the second set of random access parameters.

29 Claims, 15 Drawing Sheets

(51) Int. Cl.
*H04W 4/70* (2018.01)
*H04W 16/14* (2009.01)
*H04W 88/02* (2009.01)

(52) U.S. Cl.
CPC ... *H04W 72/0406* (2013.01); *H04W 72/0446* (2013.01); *H04W 88/023* (2013.01); *H04W 72/0453* (2013.01)

(56) References Cited

U.S. PATENT DOCUMENTS

| | | | | |
|---|---|---|---|---|
| 2020/0077451 | A1* | 3/2020 | You | H04W 74/0833 |
| 2020/0245200 | A1* | 7/2020 | Xiong | H04B 7/0695 |
| 2020/0373989 | A1* | 11/2020 | Yan | H04W 52/42 |
| 2021/0075574 | A1* | 3/2021 | Jung | H04W 74/0833 |
| 2021/0274538 | A1* | 9/2021 | Liu | H04W 72/1268 |
| 2021/0368548 | A1* | 11/2021 | Pelletier | H04W 74/0833 |

OTHER PUBLICATIONS

Huawei et al., "Overview of NR UL for LTE-NR Coexistence", 3GPP Draft; R1-1709979, 3rd Generation Partnership Project (3GPP), Mobile Competence Centre ; 650, Route Des Lucioles ; F-06921 Sophia-Antipolis Cedex; France, vol. RAN WG1, No. Qingdao, China, Jun. 17, 2017 (Jun. 17, 2017), XP051304719, Retrieved from the Internet:URL:http://www.3gpp.org/ftp/tsg_ran/WG1_RL1/TSGR1_AH/NR_AH_1706/Docs/, 12 pages.

3rd Generation Partnership Project; Technical Specification Group Radio Access Network; Study on New Radio Access Technology Physical Layer Aspects (Release 14), 3GPP Standard; Technical Report; 3GPP TR 38.802, 3rd Generation Partnership Project (3GPP), Mobile Competence Centre; 650, Route Des Lucioles; F-06921 Sophia-Antipolis Cedex; France, vol. RAN WG1, No. V14.1.0, Jun. 23, 2017, pp. 1-143, XP051299025, [retrieved on Jun. 23, 2017].

International Search Report and Written Opinion—PCT/US2018/042911—ISA/EPO—dated Sep. 27, 2018 (175704WO).

* cited by examiner

RANDOM ACCESS PROCEDURE WITH CROSS BAND DOWNLINK/UPLINK PAIRING

CROSS REFERENCES

The present Application for Patent claims the benefit of U.S. Provisional Patent Application No. 62/547,463 by ZHANG, et al., entitled "RANDOM ACCESS PROCEDURE WITH CROSS BAND DOWNLINK/UPLINK PAIRING," filed Aug. 18, 2017, assigned to the assignee hereof, and expressly incorporated by reference herein in its entirety.

BACKGROUND

The following relates generally to wireless communication, and more specifically to a random access procedure with cross band downlink/uplink pairing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Some wireless communication systems may support cross band pairing where different radio frequency spectrum bands, radio access technologies (RATs), and the like, are paired for uplink and/or downlink communications. For example, some wireless communication systems may pair a millimeter wave (mmW) band in the downlink with a sub-6 GHz and/or mmW band in the uplink. Such pairings, however, may generate difficulties for access procedures between the UE and base station. For example, some UEs may support communicating in both bands whereas other UEs may only support communicating in one band. Moreover, the coverage area in a sub-6 GHz band may be different than the coverage area on a mmW band. Thus, the base station may be unable to support random access procedures in both scenarios.

SUMMARY

The described techniques relate to improved methods, systems, devices, or apparatuses that support a random access procedure with cross band downlink/uplink pairing. Generally, the described techniques provide for a base station to transmit two sets of random access parameters in a cross band pairing deployment. For example, the base station may transmit a broadcast message that is beamformed in a plurality of different directions. The broadcast message may include parameters associated with a random access procedure in both the transmitted band (e.g., mmW band) and also a paired band (e.g., a sub-6 GHz band). The random access parameters may include information used by a user equipment (UE) to perform a random access procedure with the base station, e.g., the location of the random access channel (RACH), target received power, nominal signal power to use for downlink measurements, and the like.

The UE may receive the broadcast message and determine whether to perform the random access procedure on one of the bands. For example, the UE may determine that it supports communicating on both bands and select a band for the random access procedure autonomously. In some examples, the UE may randomly select one of the supported bands for the random access procedure and/or may consider various metrics when selecting the band. Example metrics may include, but are not limited to, the channel performance on the supported bands, the channel load on supported bands, a transmission metric of the UE, and the like. In some aspects, the UE may select one band on which to initiate the random access procedure and then, mid-procedure, switch to the other supported band to complete the random access procedure. The UE may complete the random access procedure with the base station using the broadcast random access parameters to establish a channel for wireless communications.

A method of wireless communication is described. The method may include receiving, from a base station, a broadcast message comprising a first set of random access parameters for a first uplink band supported by the base station and a second set of random access parameters associated with a second uplink band supported by the base station, selecting one of the first set of random access parameters or the second set of random access parameters for a random access signal, and transmitting a random access signal over one of the first uplink band or the second uplink band using the selected one of the first set of random access parameters or the second set of random access parameters.

An apparatus for wireless communication is described. The apparatus may include means for receiving, from a base station, a broadcast message comprising a first set of random access parameters for a first uplink band supported by a base station and a second set of random access parameters associated with a second uplink band supported by the base station, means for selecting one of the first set of random access parameters or the second set of random access parameters for a random access signal, and means for transmitting a random access signal over one of the first uplink band or the second uplink band using the selected one of the first set of random access parameters or the second set of random access parameters.

Another apparatus for wireless communication is described. The apparatus may include a processor, memory in electronic communication with the processor, and instructions stored in the memory. The instructions may be operable to cause the processor to receive, from a base station, a broadcast message comprising a first set of random access parameters for a first uplink band supported by the base station and a second set of random access parameters associated with a second uplink band supported by the base station, select one of the first set of random access parameters or the second set of random access parameters for a random access signal, and transmit a random access signal over one of the first uplink band or the second uplink band using the selected one of the first set of random access parameters or the second set of random access parameters.

A non-transitory computer readable medium for wireless communication is described. The non-transitory computer-readable medium may include instructions operable to cause a processor to receive, from a base station, a broadcast message comprising a first set of random access parameters for a first uplink band supported by the base station and a second set of random access parameters associated with a second uplink band supported by the base station, select one of the first set of random access parameters or the second set of random access parameters for a random access signal, and transmit a random access signal over one of the first uplink band or the second uplink band using the selected one of the first set of random access parameters or the second set of random access parameters.

Some examples of the method, apparatus, and non-transitory computer-readable medium described above may further include processes, features, means, or instructions for identifying, at the UE, support for both the first uplink band and the second uplink band, wherein selecting one of the first set of random access parameters or the second set of random access parameters may be based at least in part on the identified support.

Some examples of the method, apparatus, and non-transitory computer-readable medium described above may further include processes, features, means, or instructions for determining that a channel performance on a downlink band may be below a threshold level, wherein the downlink band comprises the first uplink band. Some examples of the method, apparatus, and non-transitory computer-readable medium described above may further include processes, features, means, or instructions for selecting one of the first set of random access parameters or the second set of random access parameters comprises selecting the second set of random access parameters based at least in part on the determining.

Some examples of the method, apparatus, and non-transitory computer-readable medium described above may further include processes, features, means, or instructions for determining that a transmission metric may have exceeded a threshold. Some examples of the method, apparatus, and non-transitory computer-readable medium described above may further include processes, features, means, or instructions for transmitting a subsequent random access signal using the second set of random access parameters based at least in part on the determining.

In some examples of the method, apparatus, and non-transitory computer-readable medium described above, the subsequent random access signal comprises a random access preamble or a RACH message.

In some examples of the method, apparatus, and non-transitory computer-readable medium described above, the subsequent RACH message comprises a RACH message 1 associated with a two-step RACH procedure or a RACH message 3 associated with a four-step RACH procedure.

Some examples of the method, apparatus, and non-transitory computer-readable medium described above may further include processes, features, means, or instructions for transmitting uplink data to the base station over the second uplink band.

Some examples of the method, apparatus, and non-transitory computer-readable medium described above may further include processes, features, means, or instructions for identifying a sync raster mapping between the first uplink band and a downlink band, the downlink band being a different band from the first uplink band. Some examples of the method, apparatus, and non-transitory computer-readable medium described above may further include processes, features, means, or instructions for receiving a downlink sync signal in the downlink band based at least in part on the sync raster mapping.

In some examples of the method, apparatus, and non-transitory computer-readable medium described above, the downlink signal comprises a synchronization signal.

Some examples of the method, apparatus, and non-transitory computer-readable medium described above may further include processes, features, means, or instructions for transmitting a subsequent random access signal using the second set of random access parameters over the second uplink band.

Some examples of the method, apparatus, and non-transitory computer-readable medium described above may further include processes, features, means, or instructions for receiving a first synchronization signal block (SSB) in a first broadcast signal, the first SSB associated with the first uplink band. Some examples of the method, apparatus, and non-transitory computer-readable medium described above may further include processes, features, means, or instructions for receiving a second SSB in a second broadcast signal, the second SSB associated with the second uplink band.

In some examples of the method, apparatus, and non-transitory computer-readable medium described above, the first broadcast signal comprises a transmission metric that may be different from a transmission metric of the second broadcast signal.

In some examples of the method, apparatus, and non-transitory computer-readable medium described above, the transmission metrics of the first broadcast signal and the second broadcast signal comprise at least one of a transmit power level, a beamforming configuration, a time resource, a frequency resource, a time-frequency resource, or any combination thereof.

In some examples of the method, apparatus, and non-transitory computer-readable medium described above, the first set of random access parameters comprise one or more of a RACH location, a target received power, a nominal signal power for downlink measurements, or any combination thereof, for the first uplink band, and the second set of random access parameters comprise one or more of a RACH location, a target received power, a nominal signal power for downlink measurements, or any combination thereof, for the second uplink band.

A method of wireless communication is described. The method may include transmitting a broadcast message comprising a first set of random access parameters for a first uplink band supported by the base station and a second set of random access parameters associated with a second uplink band supported by the base station, receiving a random access signal from a UE over one of the first uplink band or the second uplink band using the selected one of the first set of random access parameters or the second set of random access parameters, and transmitting a random access response signal corresponding to the random access signal from the UE.

An apparatus for wireless communication is described. The apparatus may include means for transmitting a broadcast message comprising a first set of random access parameters for a first uplink band supported by a base station and a second set of random access parameters associated with a second uplink band supported by the base station, means for receiving a random access signal from a UE over one of the first uplink band or the second uplink band using the selected one of the first set of random access parameters or the second set of random access parameters, and means for transmitting a random access response signal corresponding to the random access signal from the UE.

Another apparatus for wireless communication is described. The apparatus may include a processor, memory in electronic communication with the processor, and instructions stored in the memory. The instructions may be operable to cause the processor to transmit a broadcast message comprising a first set of random access parameters for a first uplink band supported by the base station and a second set of random access parameters associated with a second uplink band supported by the base station, receive a random access signal from a UE over one of the first uplink band or the second uplink band using the selected one of the first set of random access parameters or the second set of random access parameters, and transmit a random access response signal corresponding to the random access signal from the UE.

A non-transitory computer readable medium for wireless communication is described. The non-transitory computer-readable medium may include instructions operable to cause a processor to transmit a broadcast message comprising a first set of random access parameters for a first uplink band supported by the base station and a second set of random access parameters associated with a second uplink band supported by the base station, receive a random access signal from a UE over one of the first uplink band or the second uplink band using the selected one of the first set of random access parameters or the second set of random access parameters, and transmit a random access response signal corresponding to the random access signal from the UE.

Some examples of the method, apparatus, and non-transitory computer-readable medium described above may further include processes, features, means, or instructions for transmitting a first SSB in a first broadcast signal, the first SSB associated with the first uplink band. Some examples of the method, apparatus, and non-transitory computer-readable medium described above may further include processes, features, means, or instructions for transmitting a second SSB in a second broadcast signal, the second SSB associated with the second uplink band.

In some examples of the method, apparatus, and non-transitory computer-readable medium described above, the first broadcast signal comprises a transmission metric that may be different from a transmission metric of the second broadcast signal.

In some examples of the method, apparatus, and non-transitory computer-readable medium described above, the transmission metrics of the first broadcast signal and the second broadcast signal comprise at least one of a transmit power level, a beamforming configuration, a time resource, a frequency resource, a time-frequency resource, or any combination thereof.

In some examples of the method, apparatus, and non-transitory computer-readable medium described above, the first set of random access parameters comprise one or more of a RACH location, a target received power, a nominal signal power for downlink measurements, or any combination thereof, for the first uplink band, and the second set of random access parameters comprise one or more of a RACH location, a target received power, a nominal signal power for downlink measurements, or any combination thereof, for the second uplink band.

DETAILED DESCRIPTION

Figure 1:
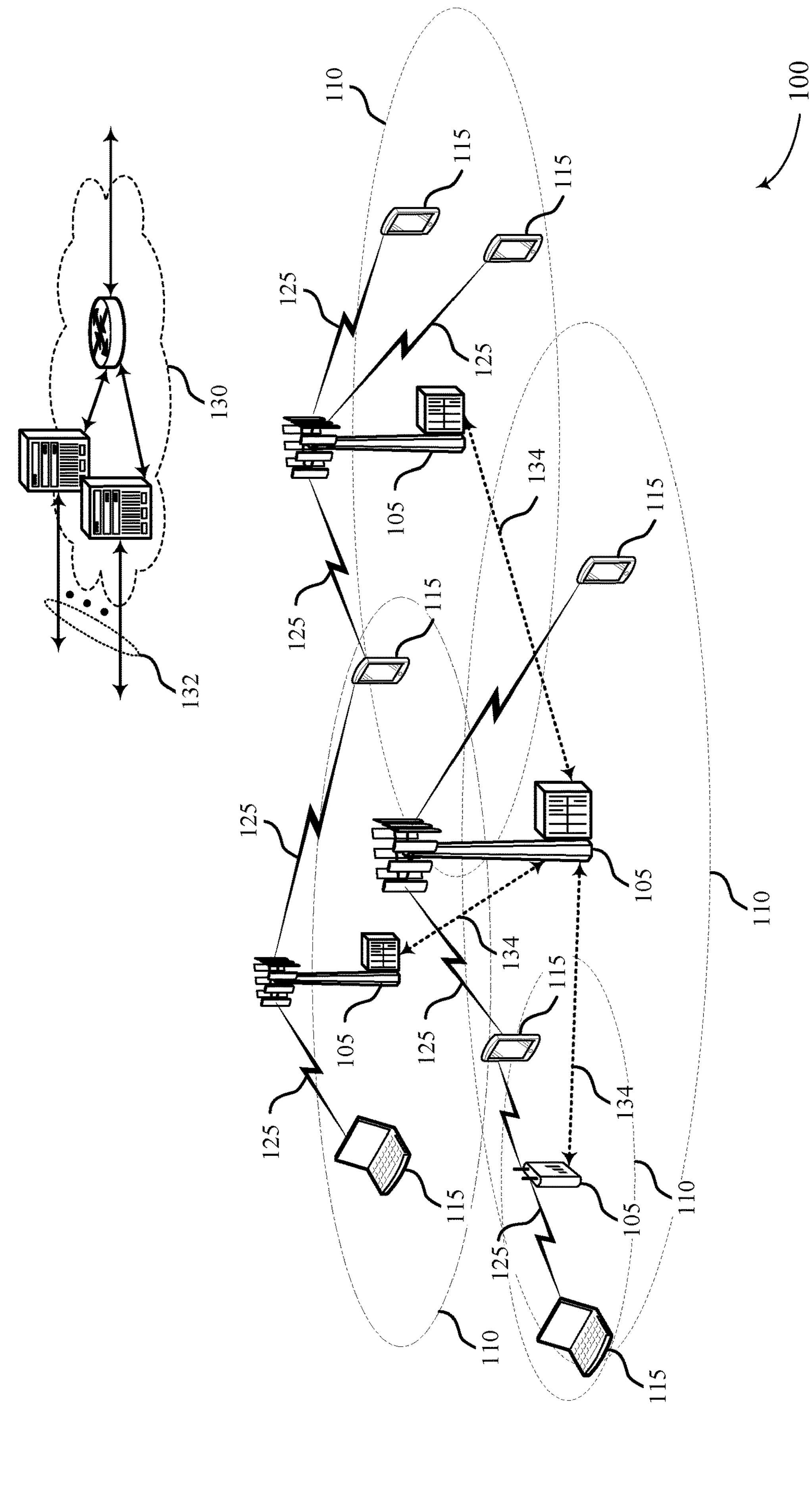
FIG. 1 illustrates an example of a system for wireless communication in accordance with aspects of the present disclosure.

Some wireless communication systems may support cross band pairing. For example, the wireless communication system may support downlink communications using a first band and uplink communications on the first band and/or on a second band. One example may include downlink communications in a millimeter wave (mmW) band and uplink communications in the mmW band and/or a non-mmW band (e.g., a sub-6 GHz band). The cross band pairing may provide for increased downlink communication rates in the mmW band and reliable communications in the second band. User equipment (UE), however, may not support communicating in both bands. For example, some UE may be configured to support mmW communications, but not sub-6 GHz communications. Aspects of the present disclosure may include advertisement of random access parameters used by the UE to establish a connection with the base station that considers the different UE configurations to ensure reliable random access procedures can be performed.

Aspects of the disclosure are initially described in the context of a wireless communications system. Generally, aspects of the disclosure support a random access procedure in a cross band downlink/uplink pairing deployment. For example, a base station (e.g., a mmW base station such as a next-generation Node B or giga-nodeB (either of which may be referred to as a gNB) may advertise two sets of random access parameters in a broadcast message. The broadcast message may be beam swept using a set of transmit beams, with each transmit beam being transmitted in a different direction. The broadcast message may be transmitted in the first band (e.g., mmW band) and may include the random access parameters used by a UE to perform a random access procedure on the mmW band. The broadcast message may also carry or otherwise convey random access parameters for a second band (e.g., a sub-6 GHz) band that the UE can use to perform a random access procedure on the second band. In some aspects, the first and second bands may refer to different radio spectrum frequency bands, different radio access technologies (RATs), and the like. Thus, the first band may refer to a mmW RAT and the second band may refer to a Long Term Evolution (LTE) or LTE-Advanced (LTE-A) RAT.

The UE may receive the broadcast message and may autonomously determine which band to use for the random access procedure. Initially, the UE may determine that it supports communicating on both bands. If so, the UE can also consider other factors when selecting which band to use for the random access procedure, e.g., channel performance on both bands, transmission metrics of the UE, channel load on both bands, and the like. In some aspects, the UE may also switch bands during the random access procedure. For example, the UE may initiate the random access procedure by transmitting a random access signal on the second band and then switch to the first band for subsequent random access signals, or vice versa. Thus, regardless of which band(s) the UE supports, the random access procedure can be performed using the random access parameters advertised in the broadcast message from the base station.

Aspects of the disclosure are further illustrated by and described with reference to apparatus diagrams, system diagrams, and flowcharts that relate to random access procedure with cross band downlink/uplink pairing.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-A network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a gNB, a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A transport channel may be used for access to the network when the UE 115 does not have accurate uplink timing synchronization, or when the UE does not have any allocated uplink transmission resource. The random access channel (RACH) is normally contention-based, which may result in collisions between UEs 115. After the UE 115 decodes a system information block (SIB)2, it may transmit a RACH preamble to a base station 105. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an uplink resource grant, a timing advance and a temporary cell radio network temporary identity (C-RNTI). The UE 115 may then transmit an radio resource control (RRC) connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

In some aspects, a base station 105 may transmit a broadcast message that includes a first set of random access parameters for a first uplink band supported by the base station 105 and a second set of random access parameters associated with a second uplink band supported by the base station 105. The base station 105 may receive a random access signal from a UE 115 over one of the first uplink band or the second uplink band using the selected one of the first set of random access parameters or the second set of random access parameters. The base station 105 may transmit a random access response signal corresponding to the random access signal from the UE 115.

In some aspects, a UE 115 may receive, from a base station 105, a broadcast message that includes a first set of random access parameters for a first uplink band supported by the base station 105 and a second set of random access parameters associated with a second uplink band supported by the base station 105. The UE 115 may select one of the first set of random access parameters or the second set of random access parameters for a random access signal. The UE 115 may transmit a random access signal over one of the first uplink band or the second uplink band using the selected one of the first set of random access parameters or the second set of random access parameters.

Figure 2:
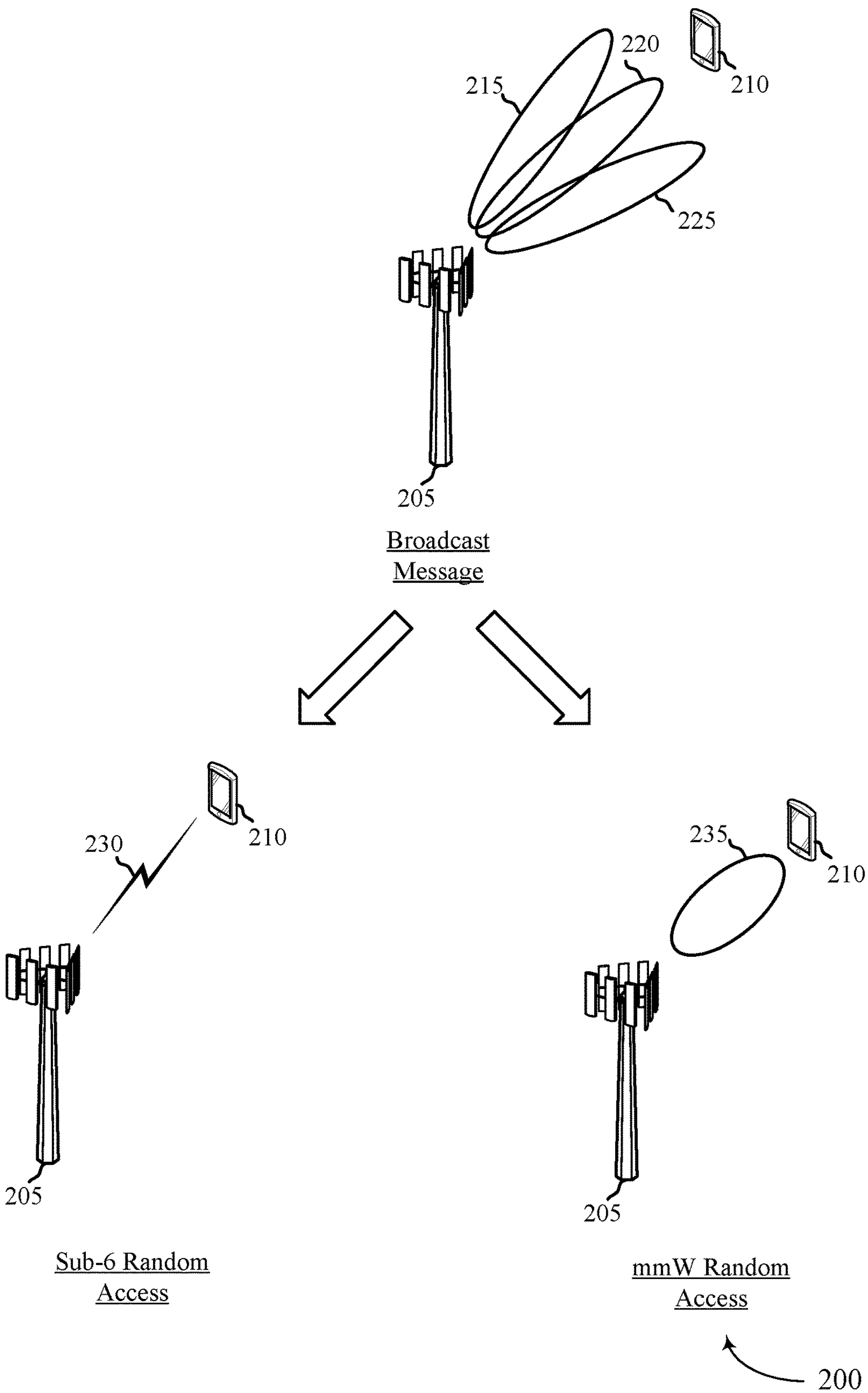
FIG. 2 illustrates an example of a system for wireless communication in accordance with aspects of the present disclosure.

FIG. 2 illustrates an example of a wireless communication system 200 that supports wireless communication in accordance with various aspects of the present disclosure. In some examples, the wireless communication system 200 may implement aspects of wireless communication system 100. Wireless communication system 200 may include a base station 205 and a UE 210, which may be examples of the corresponding devices described herein.

Generally, wireless communication system 200 may support cross band pairing. The cross band pairing may include the base station 205 supporting communications on two bands. The base station 205 may support downlink communications on a downlink band corresponding to a first uplink band, e.g., a mmW band, and also support communications on a second band, e.g., a sub-6 GHz band. In some aspects, the described bands may refer to a different radio frequency spectrum band, to a different radio access technology (RAT), to a different wireless provider, and the like. For example, the supported bands may include a mmW band and a non-mmW band, e.g., a LTE/LTE-A band, a sub-6 GHz band, and the like. In some aspects, the supported bands may include a mmW RAT and a LTE/LTE-A RAT. Supporting communications in the mmW band may include directional transmissions where the base station 205 beamforms signals in a plurality of different directions using a beamforming configuration.

In some aspects, base station 205 may transit broadcast signals/messages using transmit beams 215, 220, and 225. As shown at the top of FIG. 2, each of transmit beams 215, 220, and 225 may be transmitted in a beam sweeping configuration such that each transmit beam is transmitted in a different direction. For example, transmit beam 215 may be transmitted in a first direction, transmit beam 220 may be transmitted in a second direction, and transmit beam 225 may be transmitted in a third direction. In this manner, the base station 205 may transmit the broadcast message(s) in every direction (or a subset of directions).

In some aspects, some or all of the transmit beams 215, 220, and 225 may carry or otherwise convey an indication of random access parameters for the supported bands. For example, some or all of transmit beams 215, 220, and 225 may carry or indicate a first set of random access parameters for a first uplink band and a second set of random access parameters for a second uplink band. The base station 205 may transmit the broadcast message in the transmit beams 215, 220, and 225 using a downlink band that corresponds to the first uplink band, e.g., in the mmW band.

The first and second sets of random access parameters may provide sufficient information to allow any UEs operating within the coverage area of base station 205 to perform a random access procedure on either band. For example, the first and/or second sets of random access parameters may include, for each respective band, the location of the RACH, a target received power level, a nominal signal power for downlink measurements, and the like. Accordingly, any UE (such as UE 210) may receive the broadcast message and select which set of random access parameters it will use for the random access procedure.

The UE 210 may receive the broadcast message from the base station 205 that indicates the two sets of random access parameters for the supported bands and select one of the bands for transmission of a random access signal. In some aspects, the set of random access parameters may selected based on which bands the UE 210 supports communicating on. For example, if the UE 210 only supports uplink communications on the first uplink band, the UE 210 would select the first set of random access parameters. If the UE 210 supports uplink communications on both of the first and second uplink bands, the UE 210 may autonomously select which uplink band to use for the random access procedure. In some aspects, the UE 210 may randomly select an uplink band and/or may consider other factors when selecting an uplink band (and corresponding set of random access parameters). Examples of factors may include, but are not limited to, the configuration of the UE 210 (e.g., number/configuration of transmit/receive chains for both supported bands), the channel performance on either of the uplink bands, the transmission metrics of the UE 210 (e.g., available transmit power), and the like. In some aspects, the factors considered by UE 210 may vary such that certain factors may be given higher priority either permanently or depending on certain criteria (e.g., the communication environment, the UE 210 mode (e.g., mobile or stationary), and the like.

For example and as shown in the bottom left of FIG. 2, the UE 210 may select the second set of random access parameters and transmit a random access signal. The random access signal transmitted using the second set of random access parameters on the second uplink band may be transmitted in a non-beamformed manner using signal 230. In some aspects, signal 230 may include a sub-6 GHz signal (e.g., a LTE/LTE-A signal) transmitted within a sector of the base station 205. Accordingly, the UE 210 may perform a sub-6 GHz random access procedure with the base station 205 using the sub-6 GHz uplink band.

As another example and as shown in the bottom right of FIG. 2, the UE 210 may select the first set of random access parameters and transmit a random access signal. The random access signal transmitted using the first set of random access parameters on the first uplink band may be transmitted in a beamformed manner using signal 235. In some aspects, signal 235 may include a mmW signal transmitted in a particular direction by base station 205. Accordingly, the UE 210 may perform a mmW random access procedure with the base station 205 using the mmW uplink band.

Figure 3:
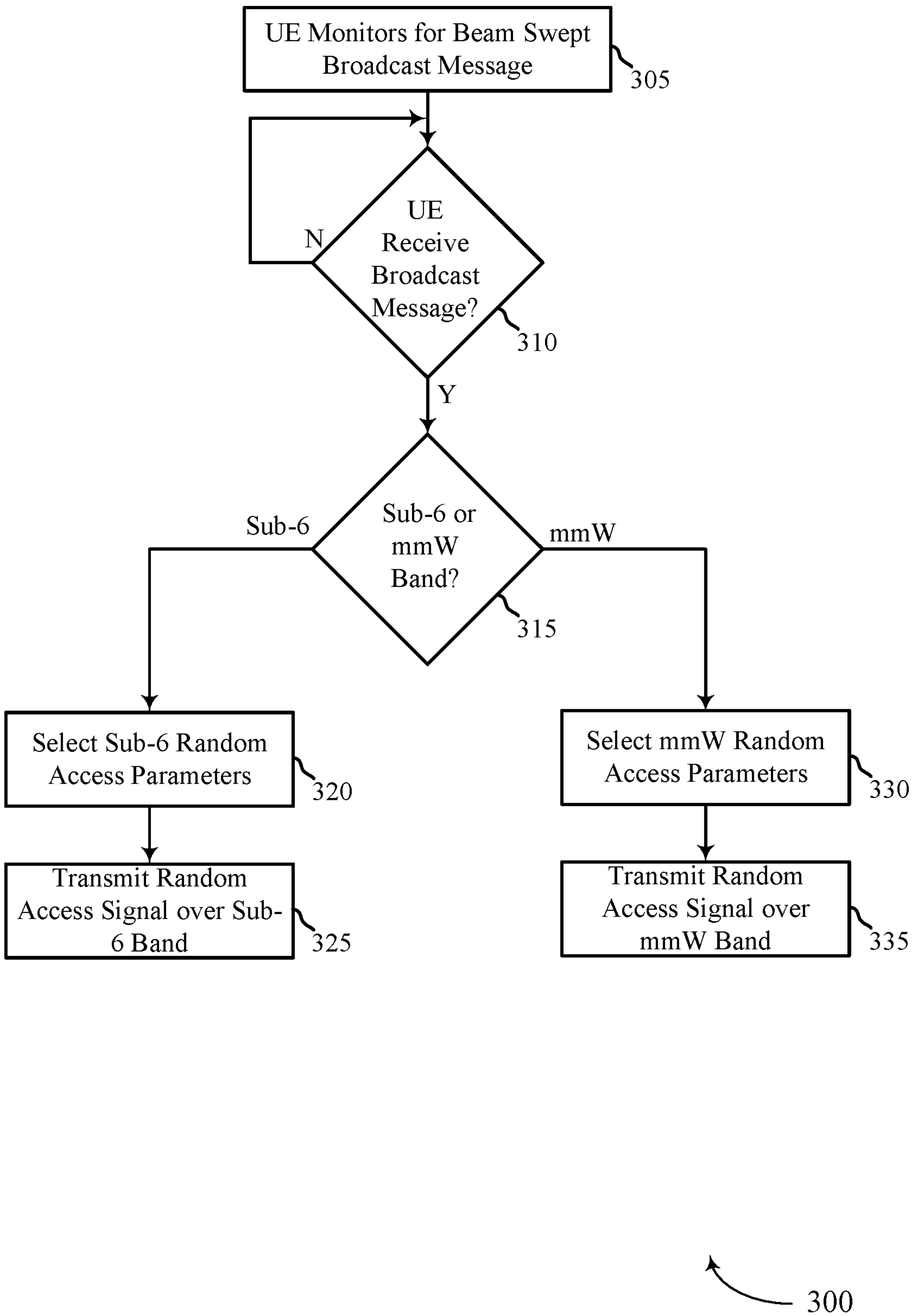
FIG. 3 illustrates an example of a method that supports wireless communication in accordance with aspects of the present disclosure.

FIG. 3 illustrates an example of a method 300 that supports wireless communication in accordance with various aspects of the present disclosure, including random access procedures with cross band downlink/uplink pairing. In some examples, method 300 may implement aspects of wireless communication systems 100 and/or 200. Aspects of method 300 may be implemented by a UE, which may be an example of the devices described herein.

At 305, a UE may monitor for one or more beam swept broadcast messages from a base station. The beam swept message(s) may be a reference signal and/or a synchronization signal. The beam swept messages may include, carry, or otherwise convey an indication of a first set of random access parameters of a first uplink band and a second set of random access parameters of a second uplink band. The broadcast messages may be transmitted in a directional transmission on a first downlink band that corresponds to the first uplink band, e.g., a mmW band. The UE may monitor for the broadcast message, for example, upon transitioning to an On Duration of a discontinuous reception (DRX) mode.

In some aspects, the first and/or second sets of random access parameters may include information usable by the UE to perform a random access procedure with the base station on the corresponding band. For example, the random access parameters may include some or all of the location of a RACH, a target received power, a nominal signal power for downlink measurements, etc.

At 310, the UE determines whether it has received a broadcast message containing the first and second sets of random access parameters. If no broadcast message is received, the UE may return to 305 where it continues to monitor for the broadcast message. In some aspects, the UE may monitor for the broadcast message while in the On Duration of the DRX mode. The UE may transition to a sleep state of the DRX mode after a predetermined time period, for example, upon expiration of an inactivity timer associated with the DRX mode.

If the broadcast message was received, at 315 the UE selects either the first set of random access parameters or the second set of random access parameters to use for performing a random access procedure with the base station. For example, initially the UE may identify or otherwise determine that it supports communicating on the first uplink band and the second uplink band. If the UE supports communicating on both bands, the UE may autonomously select the first or second set of random access parameters for the random access procedure.

In some aspects, the UE may consider various factors or attributes when selecting the first or second set of random access parameters. One factor may include a downlink pathloss measurement for the downlink channel. For example, the UE may determine whether a channel performance on a downlink band is below a threshold level. The downlink band may correspond to or otherwise be the same as the first uplink band, e.g., the band that the UE receives the broadcast message on. The channel performance may refer to one or more of an interference level on the downlink band, a received power level of a signal received over the downlink band, a supported coding rate associated with the downlink band, and the like. If the channel performance on the downlink band satisfies a threshold (e.g., is below the threshold for an interference level, is above the threshold for a received power level, etc.), the UE may select the first or second set of random access parameters based on the channel performance.

Another factor may include one or more transmission metrics of the UE. For example, the UE may determine what its maximum available transmit power level is and then select the first or second set of random access parameters based on the transmission metric. For example, the UE may start the random access procedure by selecting the first set of random access parameters for transmission of a random access signal. Then, the UE may determine that it has reached its maximum allowed transmit power level and switch to the second uplink band for subsequent random access signals and/or retransmissions of the random access signal. Examples of subsequent random access signals may include a random access preamble, a RACH message (e.g., a RACH message 1 for a two-step RACH procedure or a RACH message 3 for a four-step RACH procedure).

In some aspects, the UE may select one uplink band initially and then switch to the second uplink band to complete the random access procedure. For example, the UE may select the first uplink band (and associated first set of random access parameters) to use to transmit a first random access signal to the base station and then select the second set of random access parameters to use to transmit subsequent random access signal to the base station on the second uplink band.

In some aspects, the UE may select one uplink band for the random access procedure and then use the other band for communicating data. For example, the UE may select the second set of random access parameters and perform the random access procedures with the base station on the second uplink band (e.g., sub-6 GHz band). The UE may then transmit uplink data to the base station on the first uplink band (e.g., mmW band). The UE may also select the first set of random access parameters for the random access procedure and then use the second uplink band to transmit data to the base station.

The UE may select either the first set of random access parameters or the second set of random access parameters according to any one, some, or all of the considerations or factors described herein. Thus, at 320 the UE may select the second set of random access parameters (e.g., the sub-6 GHz random access parameters) and transmit a random access signal over the second uplink band at 325. Or, at 323 the UE may select the first set of random access parameters (e.g., the mmW random access parameters) and transmit a random access signal over the first uplink band at 335. Based on the random access procedure using the selected first or second set of random access parameter, the UE may perform uplink and/or downlink communications with the base station.

In some aspects, there may be a linkage between the second uplink band and a SYNC raster (e.g., potential sync locations) associated with the first uplink band. For example, a UE supporting downlink communications in the mmW band and uplink communications in the sub-6 GHz band may use the sub-6 GHz band information to determine the potential sync locations in the mmW band. The sync locations in the mmW band intended for UE using sub-6 GHz band for initial access may be different from the sync locations intended for a UE using the mmW band for initial access. This may provide for UEs with different capability configurations or UEs with initial access on different band to find their relevant sync block. Thus, the UE may identify the sync channel location mapping between the first uplink band and a downlink band that is different from the first uplink band. The UE may then receive a downlink signal on a channel of the downlink band based on the corresponding raster mapping.

Figure 4:
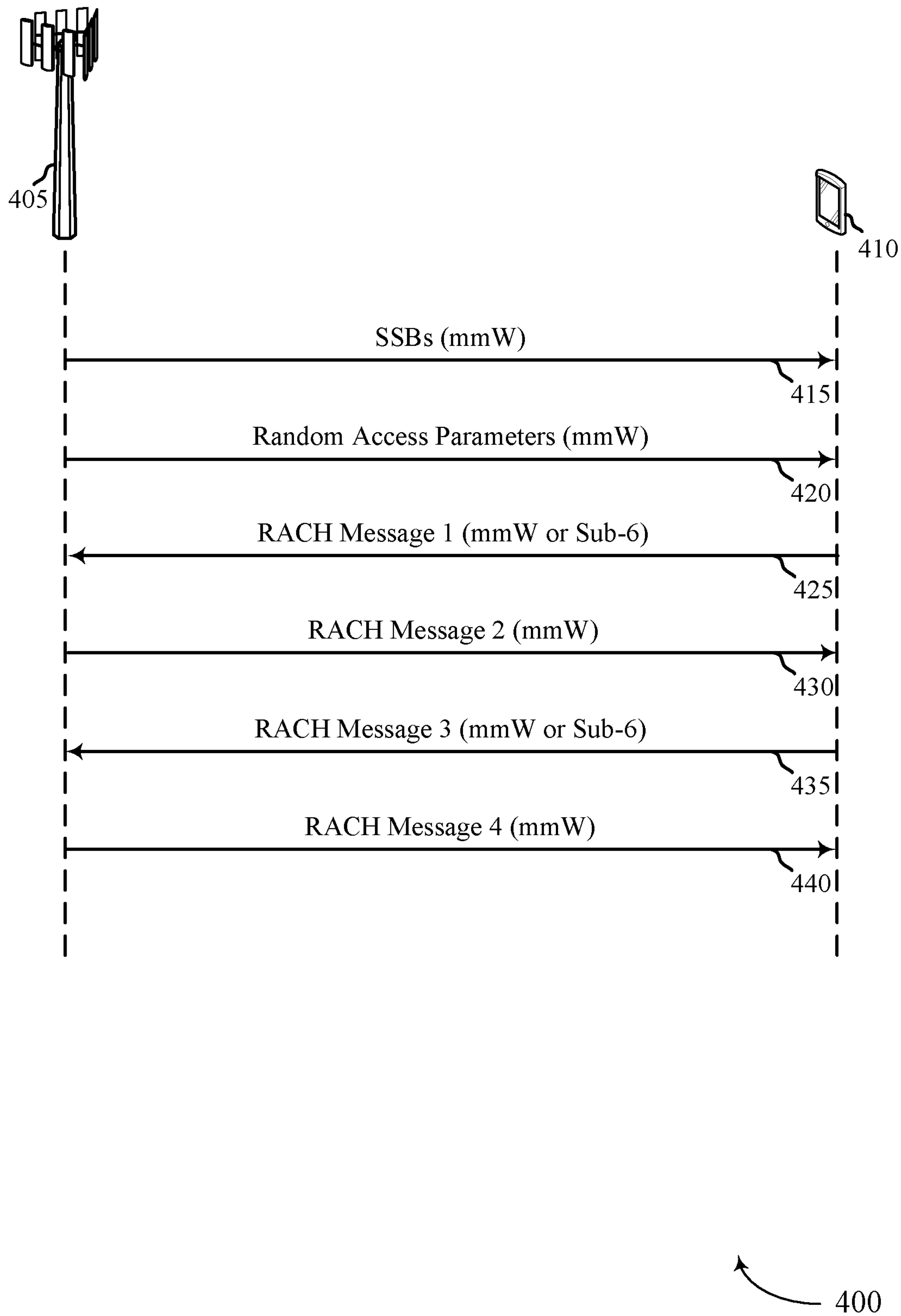
FIG. 4 illustrates an example of a process that supports wireless communication in accordance with aspects of the present disclosure.

FIG. 4 illustrates an example of a process 400 that supports wireless communication in accordance with various aspects of the present disclosure, including random access procedures with cross band downlink/uplink pairing. In some examples, process 400 may implement aspects of wireless communication systems 100/200 and/or method 300. Process 400 may include a base station 405 and a UE 410, which may be examples of the corresponding devices described herein.

In some aspects, the base station 405 may transmit two sets of synchronization signal blocks (SSBs). One set of SSBs for UE configured to receive downlink and uplink communications on the mmW band and the other set of SSBs for UEs configured to receive downlink communications on the mmW band and uplink communications on the sub-6 GHz band. This may support different coverage areas associated with mmW and sub-6 GHz bands. The transmission of the two sets of SSBs may be designed to be compatible for the corresponding uplink coverage area. For example, the SSBs intended for UEs configure for mmW uplink communications may have a different beam width, as compared to the SSBs intended for UEs configured for sub-6 GHz uplink communications. The two sets of SSBs may be transmitted using different time and/or frequency resources. The base station 405 may advertise the set of SSBs meant for mmW and sub-6 GHz uplink UEs and the receiving UEs may use the measurement with the corresponding SSB set for random access signal transmission(s).

Thus, at 415 the base station 405 may transmit the two sets of SSBs. The two sets of SSBs may be transmitted over the mmW band and, in some aspects, may be transmitted in different broadcast messages. For example, the first set of SSBs may be transmitted in a first broadcast message and the second set of SSBs may be transmitted in a second broadcast message. As discussed, the first and second broadcast messages may have different transmission metrics (e.g., different beamforming configurations, transmit power levels, time/frequency resources, etc.).

At 420, the base station 405 may transmit a broadcast message that includes or otherwise indicates the first set of random access parameters for the first uplink band and the second set of uplink parameters for the second uplink band. The broadcast message may be transmitted on the mmW band.

At 425, the UE 410 may transmit a RACH message (e.g., a random access signal) to the base station 405 using the selected first set of random access parameters (e.g., on the mmW band) or the second set of random access parameters (e.g., on the sub-6 GHz band). In some aspects, the RACH message may be a RACH message 1. The UE 410 may transmit the RACH message 1 on the mmW band based on the first set of SSBs and the first set of random access parameters or on the sub-6 GHz band based on the second set of SSBs and the second set of random access parameters. The first set and the second set of SSBs may be different or they may be the same.

At 430, the base station 405 may transmit a RACH message 2 to the UE 410. The RACH message 2 may be transmitted on the mmW band and may be associated with a downlink beam.

At 435, the UE 410 may transmit a RACH message 3 to the base station 405. The RACH message 3 may be transmitted on the mmW band or the sub-6 GHz band, depending upon the selected set of random access parameters. As discussed, the UE 410 may switch the selected set of random access parameters during the random access procedure such that the RACH message 1 and the RACH message 3 may be transmitted on different bands.

At 440, the base station 405 may transmit a RACH message 4 to the UE 410. The RACH message 4 may be transmitted on the mmW band with the associated downlink beam.

Figure 5:
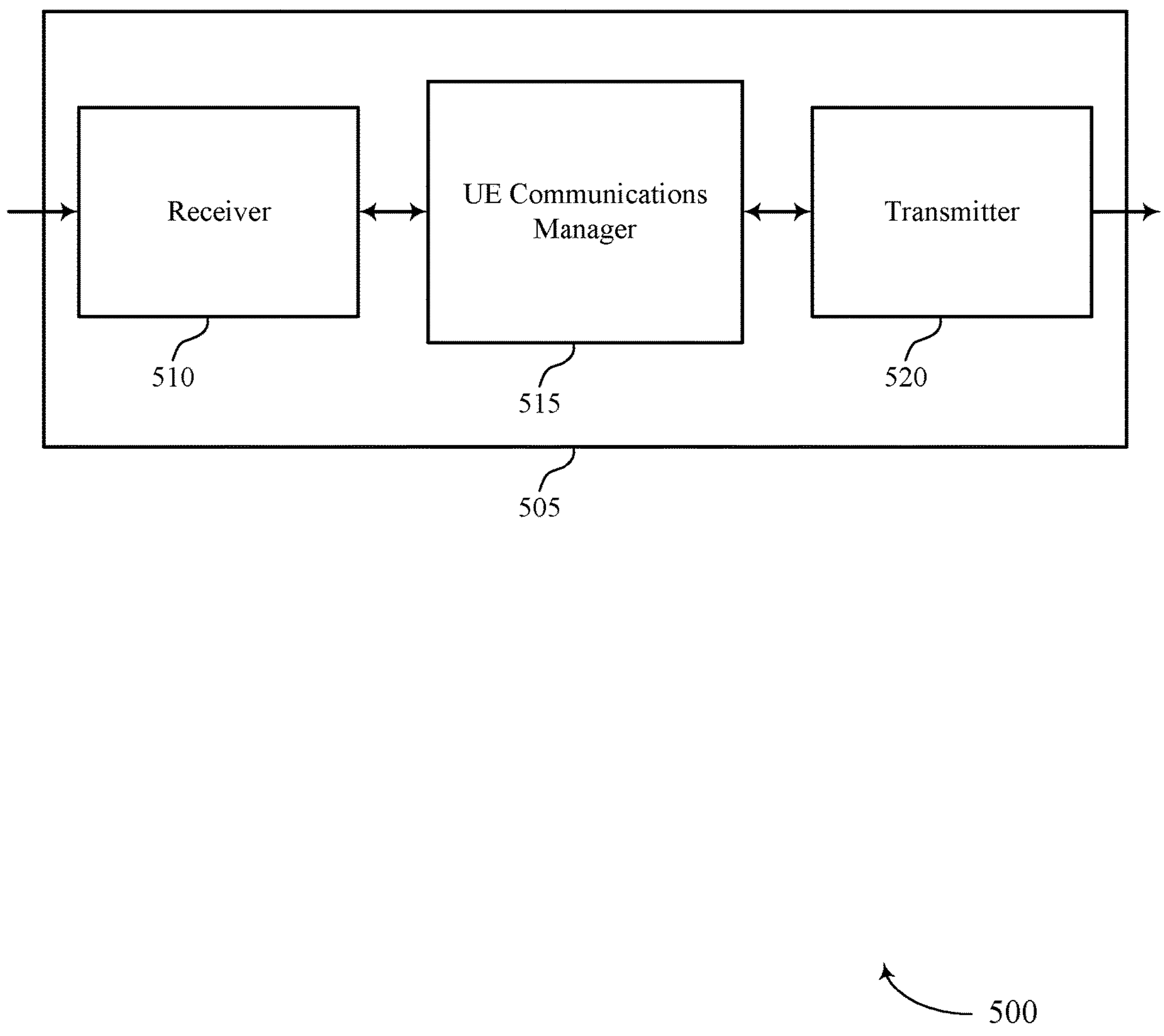
FIGS. 5 through 7 illustrate block diagrams of a device that supports wireless communication in accordance with aspects of the present disclosure.

FIG. 5 shows a block diagram 500 of a wireless device 505 that supports wireless communication in accordance with aspects of the present disclosure, including random access procedures with cross band downlink/uplink pairing. Wireless device 505 may be an example of aspects of a UE as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to random access procedure with cross band downlink/uplink pairing, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, from a base station, a broadcast message including a first set of random access parameters for a first uplink band supported by the base station and a second set of random access parameters associated with a second uplink band supported by the base station. UE communications manager 515 may select one of the first set of random access parameters or the second set of random access parameters for a random access signal. UE communications manager 515 may transmit a random access signal over one of the first uplink band or the second uplink band using the selected one of the first set of random access parameters or the second set of random access parameters.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
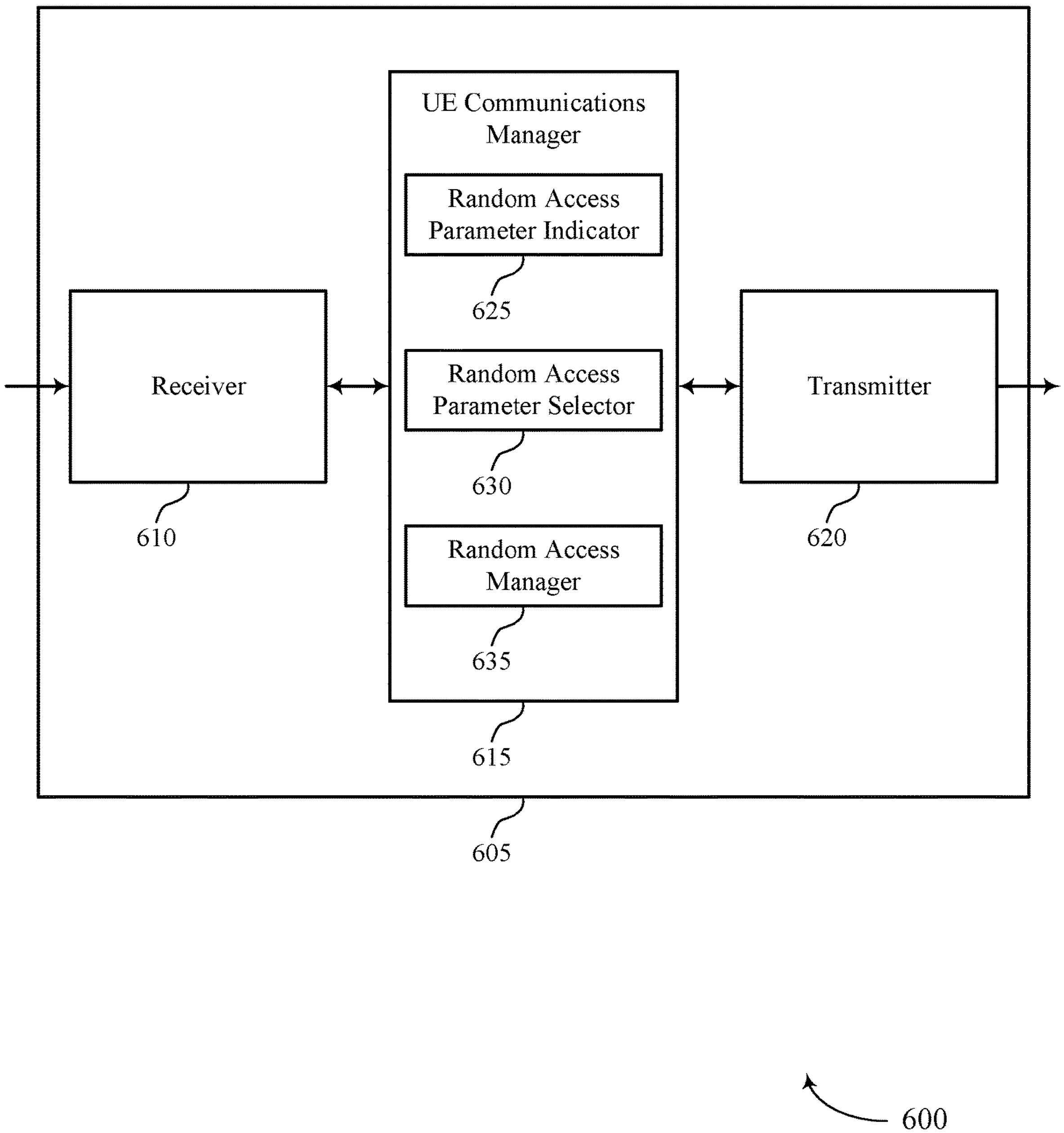

FIG. 6 shows a block diagram 600 of a wireless device 605 that supports wireless communication in accordance with aspects of the present disclosure, including random access procedures with cross band downlink/uplink pairing. Wireless device 605 may be an example of aspects of a wireless device 505 or a UE as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to random access procedure with cross band downlink/uplink pairing, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include random access parameter indicator 625, random access parameter selector 630, and random access manager 635.

Random access parameter indicator 625 may receive, from a base station, a broadcast message including a first set of random access parameters for a first uplink band supported by the base station and a second set of random access parameters associated with a second uplink band supported by the base station. In some cases, the first set of random access parameters include one or more of a RACH location, a target received power, a nominal signal power for downlink measurements, or any combination thereof, for the first uplink band, and the second set of random access parameters include one or more of a RACH location, a target received power, a nominal signal power for downlink measurements, or any combination thereof, for the second uplink band.

Random access parameter selector 630 may select one of the first set of random access parameters or the second set of random access parameters for a random access signal.

Random access manager 635 may transmit a random access signal over one of the first uplink band or the second uplink band using the selected one of the first set of random access parameters or the second set of random access parameters.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
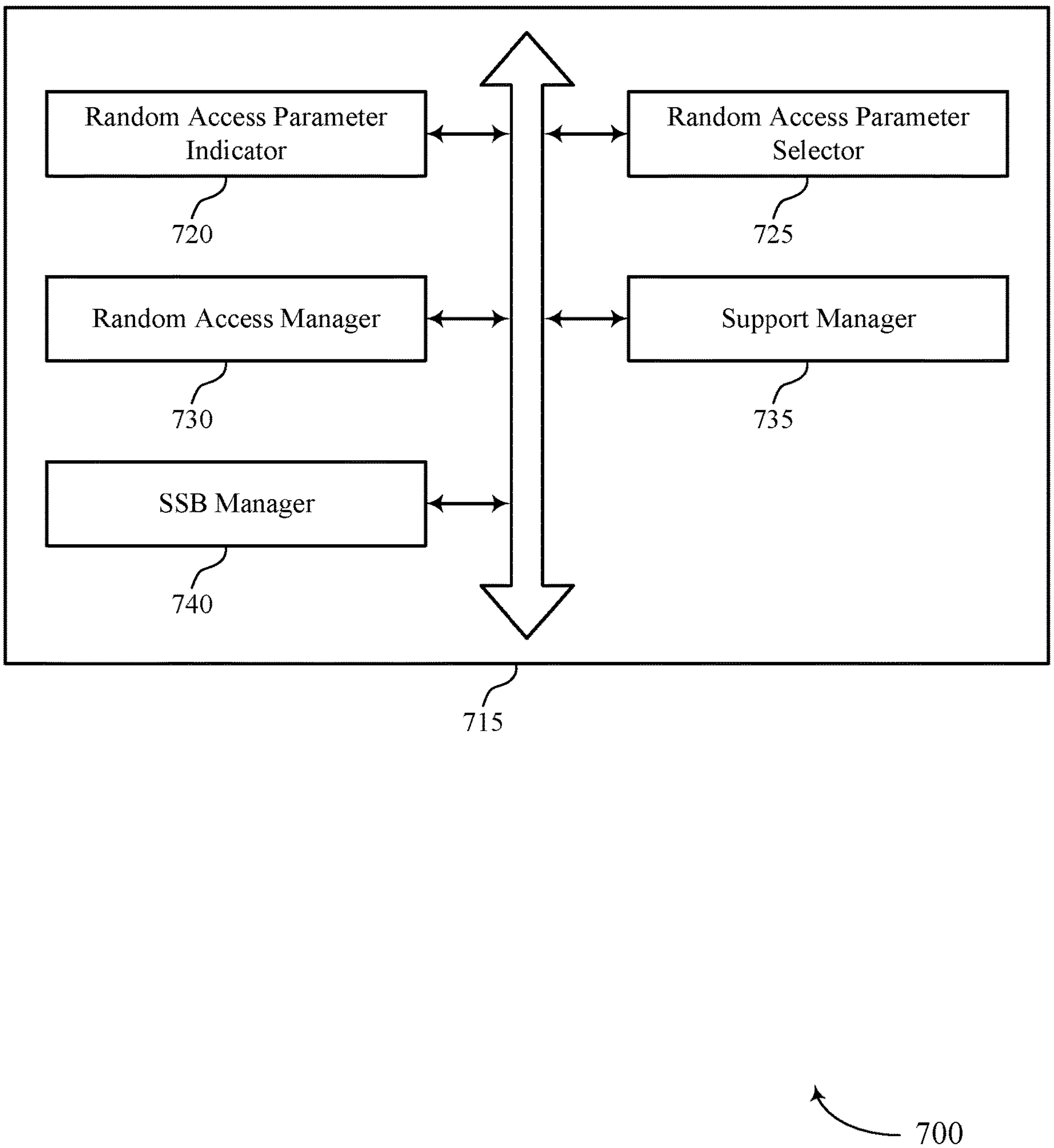

FIG. 7 shows a block diagram 700 of a UE communications manager 715 that supports wireless communication in accordance with aspects of the present disclosure, including random access procedures with cross band downlink/uplink pairing. The UE communications manager 715 may be an example of aspects of a UE communications manager 515, a UE communications manager 615, or a UE communications manager 815 described with reference to FIGS. 5, 6, and 8. The UE communications manager 715 may include random access parameter indicator 720, random access parameter selector 725, random access manager 730, support manager 735, and SSB manager 740. Each of these modules may communicate, directly or indirectly, with one another (e.g., via one or more buses).

Random access parameter indicator 720 may receive, from a base station, a broadcast message including a first set of random access parameters for a first uplink band supported by the base station and a second set of random access parameters associated with a second uplink band supported by the base station. In some cases, the first set of random access parameters include one or more of a RACH location, a target received power, a nominal signal power for downlink measurements, or any combination thereof, for the first uplink band, and the second set of random access parameters include one or more of a RACH location, a target received power, a nominal signal power for downlink measurements, or any combination thereof, for the second uplink band.

Random access parameter selector 725 may select one of the first set of random access parameters or the second set of random access parameters for a random access signal.

Random access manager 730 may transmit a random access signal over one of the first uplink band or the second uplink band using the selected one of the first set of random access parameters or the second set of random access parameters.

Support manager 735 may identify, at the UE, support for both the first uplink band and the second uplink band, where selecting one of the first set of random access parameters or the second set of random access parameters is based on the identified support. Support manager 735 may transmit a subsequent random access signal using the second set of random access parameters over the second uplink band, select one of the first set of random access parameters or the second set of random access parameters includes selecting the second set of random access parameters based on the determining. Support manager 735 may determine that a transmission metric has exceeded a threshold, transmit a subsequent random access signal using the second set of random access parameters based on the determining. Support manager 735 may determine that a channel performance on a downlink band is below a threshold level, where the downlink band includes the first uplink band, transmit uplink data to the base station over the second uplink band. Support manager 735 may identify a sync raster mapping between the first uplink band and a downlink band, the downlink band being a different band from the first uplink band, and receive a downlink sync signal in the downlink band based on the sync raster mapping. In some cases, the subsequent random access signal includes a random access preamble or a RACH message. In some cases, the subsequent RACH message includes a RACH message 1 associated with a two-step RACH procedure or a RACH message 3 associated with a four-step RACH procedure.

SSB manager 740 may receive a first SSB in a first broadcast signal, the first SSB associated with the first uplink band and receive a second SSB in a second broadcast signal, the second SSB associated with the second uplink band. In some cases, the first broadcast signal includes a transmission metric that is different from a transmission metric of the second broadcast signal. In some cases, the transmission metrics of the first broadcast signal and the second broadcast signal include at least one of a transmit power level, a beamforming configuration, a time resource, a frequency resource, a time-frequency resource, or any combination thereof.

Figure 8:
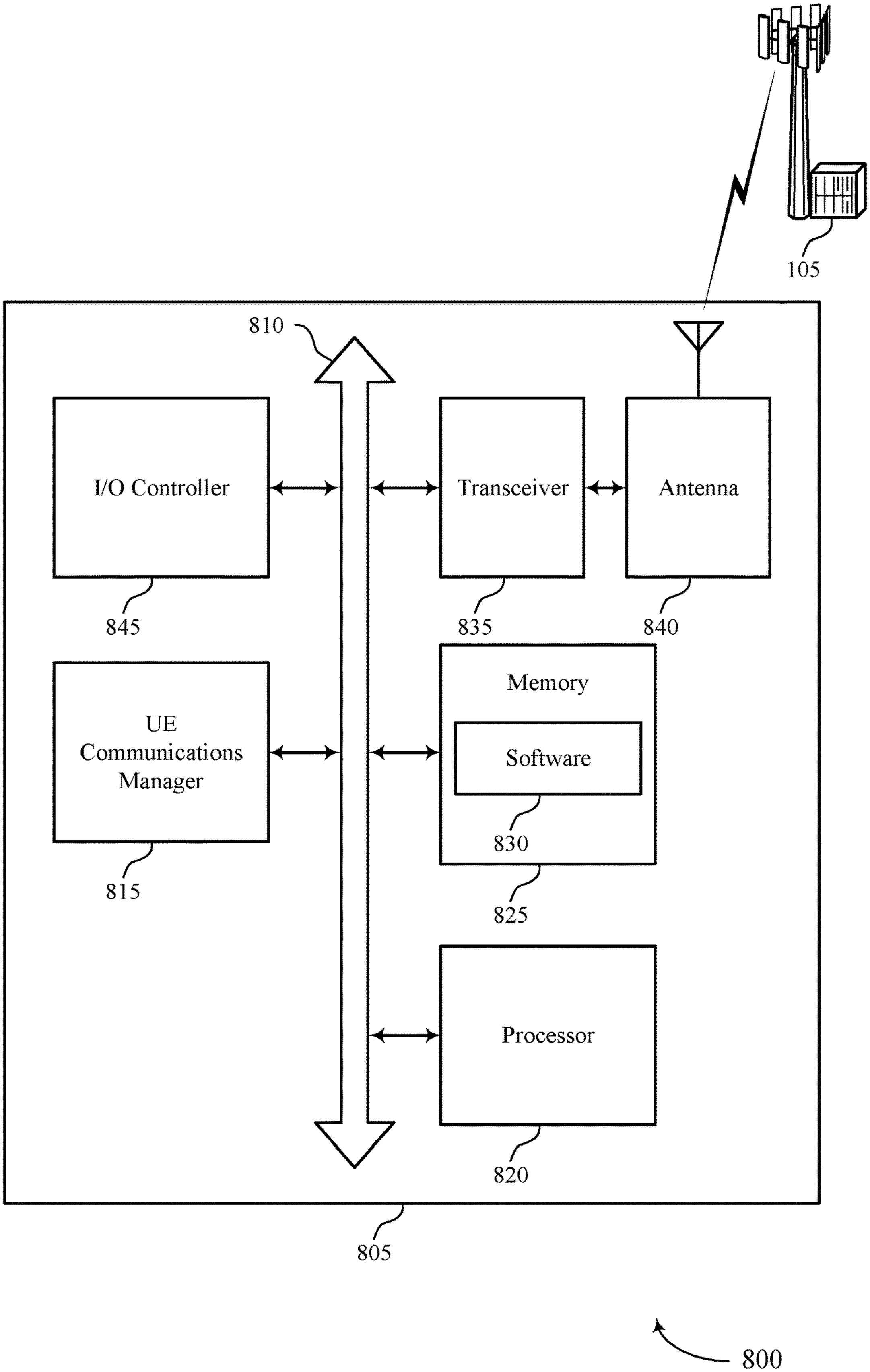
FIG. 8 illustrates a block diagram of a system including a UE that supports wireless communication in accordance with aspects of the present disclosure.

FIG. 8 shows a diagram of a system 800 including a device 805 that supports wireless communication in accordance with aspects of the present disclosure, including random access procedures with cross band downlink/uplink pairing. Device 805 may be an example of or include the components of wireless device 505, wireless device 605, or a UE as described herein. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting random access procedure with cross band downlink/uplink pairing).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support random access procedure with cross band downlink/uplink pairing. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
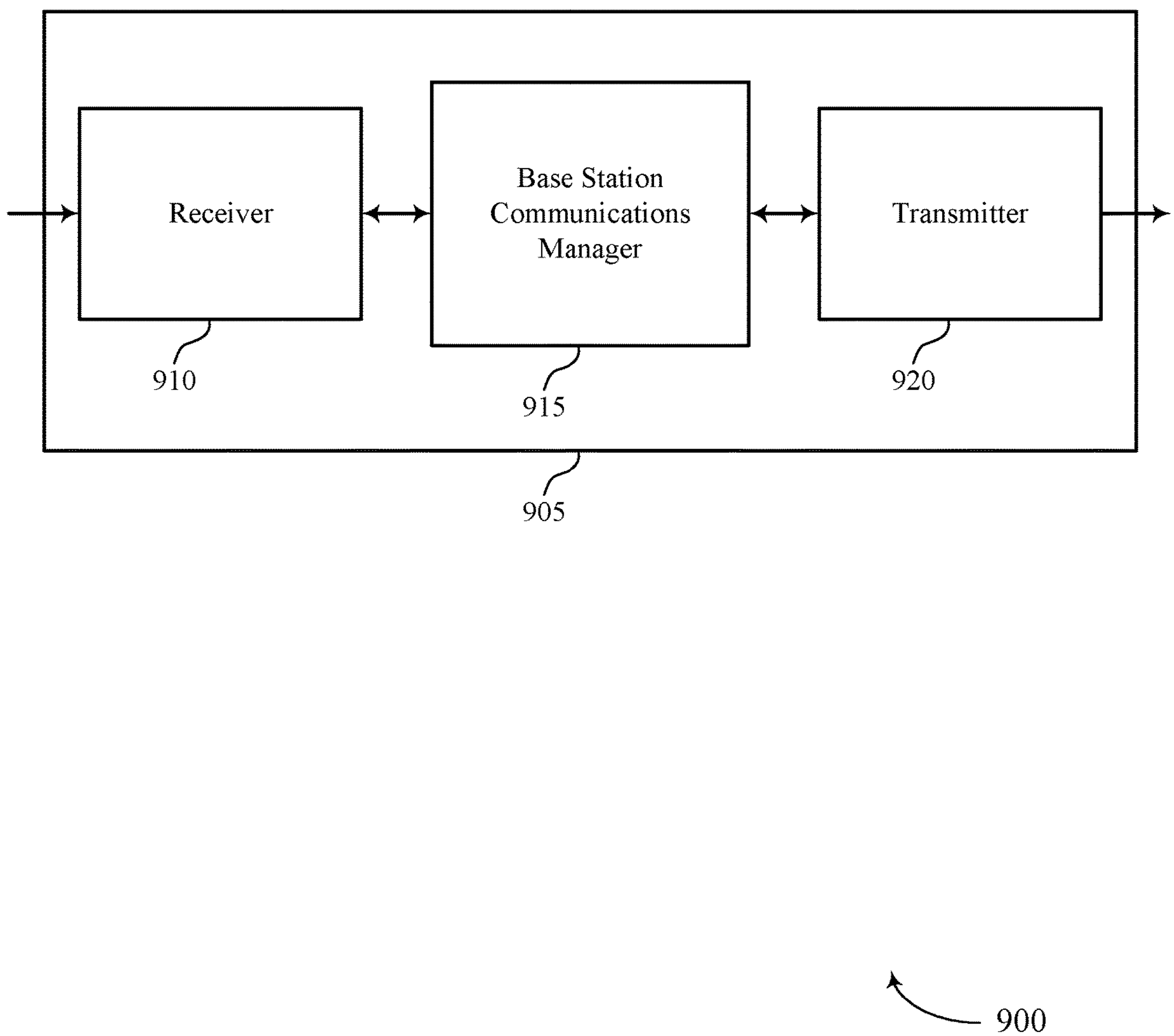
FIGS. 9 through 11 illustrate block diagrams of a device that supports wireless communication in accordance with aspects of the present disclosure.

FIG. 9 shows a block diagram 900 of a wireless device 905 that supports wireless communication in accordance with aspects of the present disclosure, including random access procedures with cross band downlink/uplink pairing. Wireless device 905 may be an example of aspects of a base station as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to random access procedure with cross band downlink/uplink pairing, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit a broadcast message including a first set of random access parameters for a first uplink band supported by the base station and a second set of random access parameters associated with a second uplink band supported by the base station. Base station communications manager 915 may receive a random access signal from a UE over one of the first uplink band or the second uplink band using the selected one of the first set of random access parameters or the second set of random access parameters. Base station communications manager 915 may transmit a random access response signal corresponding to the random access signal from the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
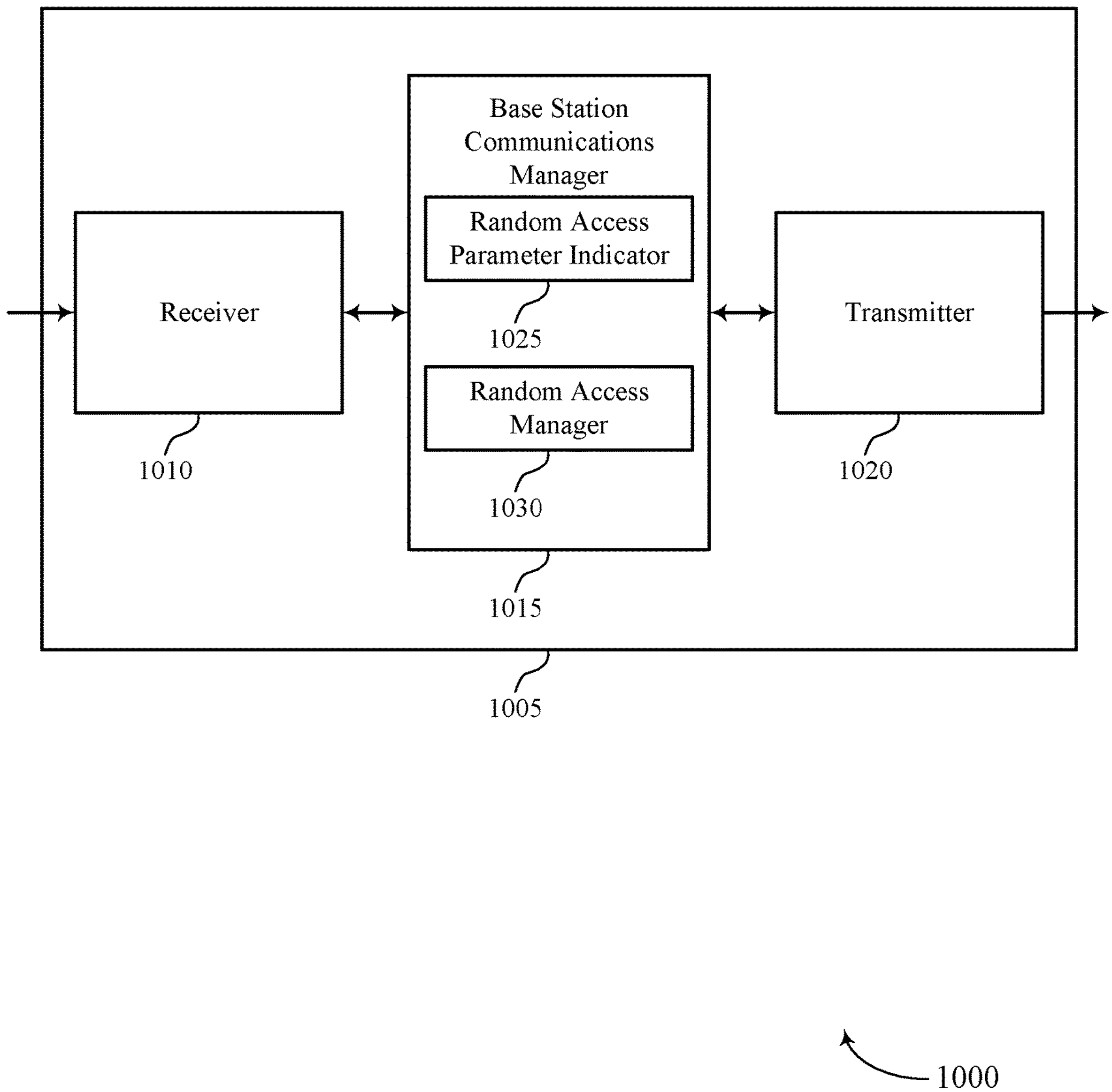

FIG. 10 shows a block diagram 1000 of a wireless device 1005 that supports wireless communication in accordance with aspects of the present disclosure, including random access procedures with cross band downlink/uplink pairing. Wireless device 1005 may be an example of aspects of a wireless device 905 or a base station as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to random access procedure with cross band downlink/uplink pairing, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include random access parameter indicator 1025 and random access manager 1030.

Random access parameter indicator 1025 may transmit a broadcast message including a first set of random access parameters for a first uplink band supported by the base station and a second set of random access parameters associated with a second uplink band supported by the base station. In some cases, the first set of random access parameters include one or more of a RACH location, a target received power, a nominal signal power for downlink measurements, or any combination thereof, for the first uplink band, and the second set of random access parameters include one or more of a RACH location, a target received power, a nominal signal power for downlink measurements, or any combination thereof, for the second uplink band.

Random access manager 1030 may receive a random access signal from a UE over one of the first uplink band or the second uplink band using the selected one of the first set of random access parameters or the second set of random access parameters and transmit a random access response signal corresponding to the random access signal from the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
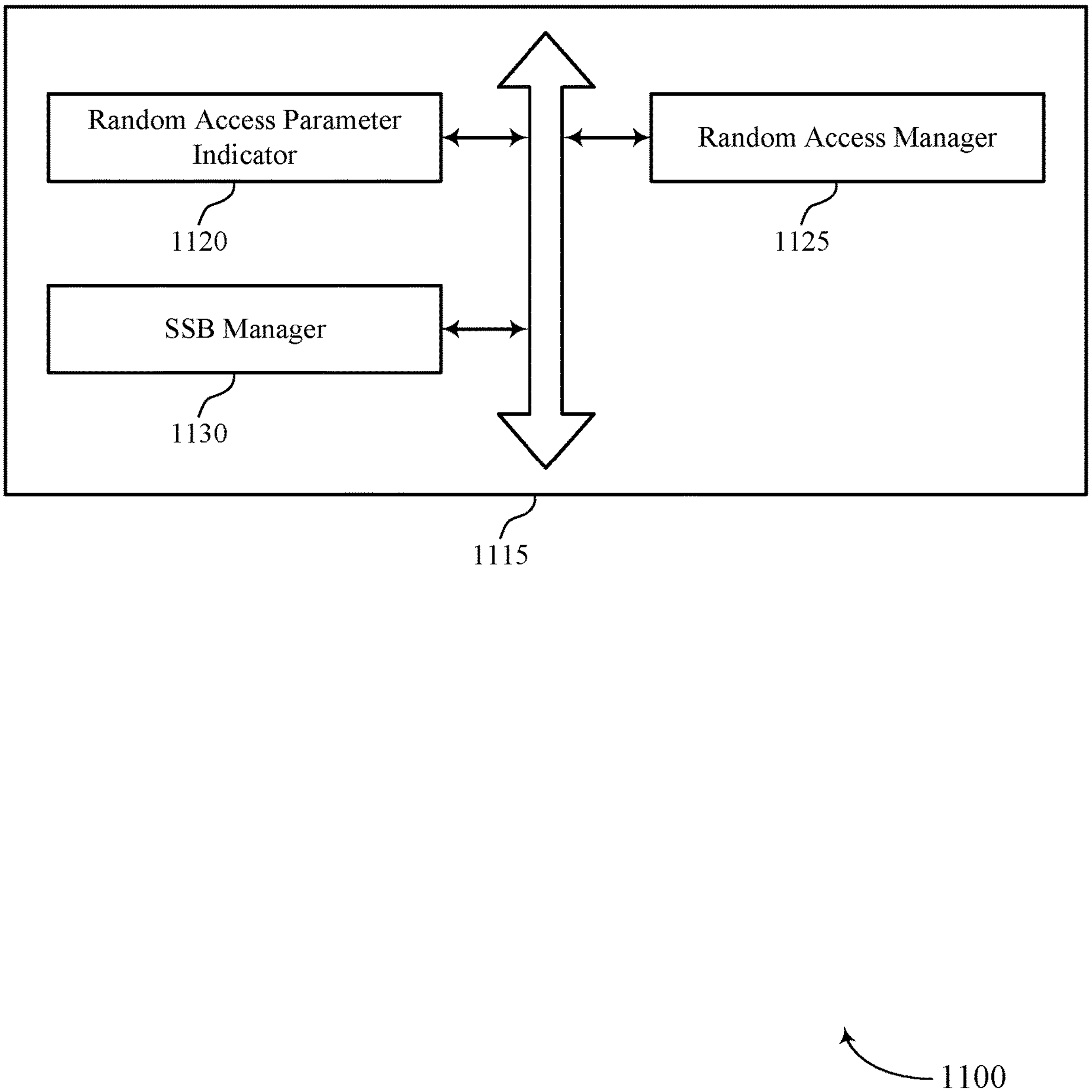

FIG. 11 shows a block diagram 1100 of a base station communications manager 1115 that supports wireless communication in accordance with aspects of the present disclosure, including random access procedures with cross band downlink/uplink pairing. The base station communications manager 1115 may be an example of aspects of a base station communications manager 1215 described with reference to FIGS. 9, 10, and 12. The base station communications manager 1115 may include random access parameter indicator 1120, random access manager 1125, and SSB manager 1130. Each of these modules may communicate, directly or indirectly, with one another (e.g., via one or more buses).

Random access parameter indicator 1120 may transmit a broadcast message including a first set of random access parameters for a first uplink band supported by the base station and a second set of random access parameters associated with a second uplink band supported by the base station. In some cases, the first set of random access parameters include one or more of a RACH location, a target received power, a nominal signal power for downlink measurements, or any combination thereof, for the first uplink band, and the second set of random access parameters include one or more of a RACH location, a target received power, a nominal signal power for downlink measurements, or any combination thereof, for the second uplink band.

Random access manager 1125 may receive a random access signal from a UE over one of the first uplink band or the second uplink band using the selected one of the first set of random access parameters or the second set of random access parameters and transmit a random access response signal corresponding to the random access signal from the UE.

SSB manager 1130 may transmit a first SSB in a first broadcast signal, the first SSB associated with the first uplink band and transmit a second SSB in a second broadcast signal, the second SSB associated with the second uplink band. In some cases, the first broadcast signal includes a transmission metric that is different from a transmission metric of the second broadcast signal. In some cases, the transmission metrics of the first broadcast signal and the second broadcast signal include at least one of a transmit power level, a beamforming configuration, a time resource, a frequency resource, a time-frequency resource, or any combination thereof.

Figure 12:
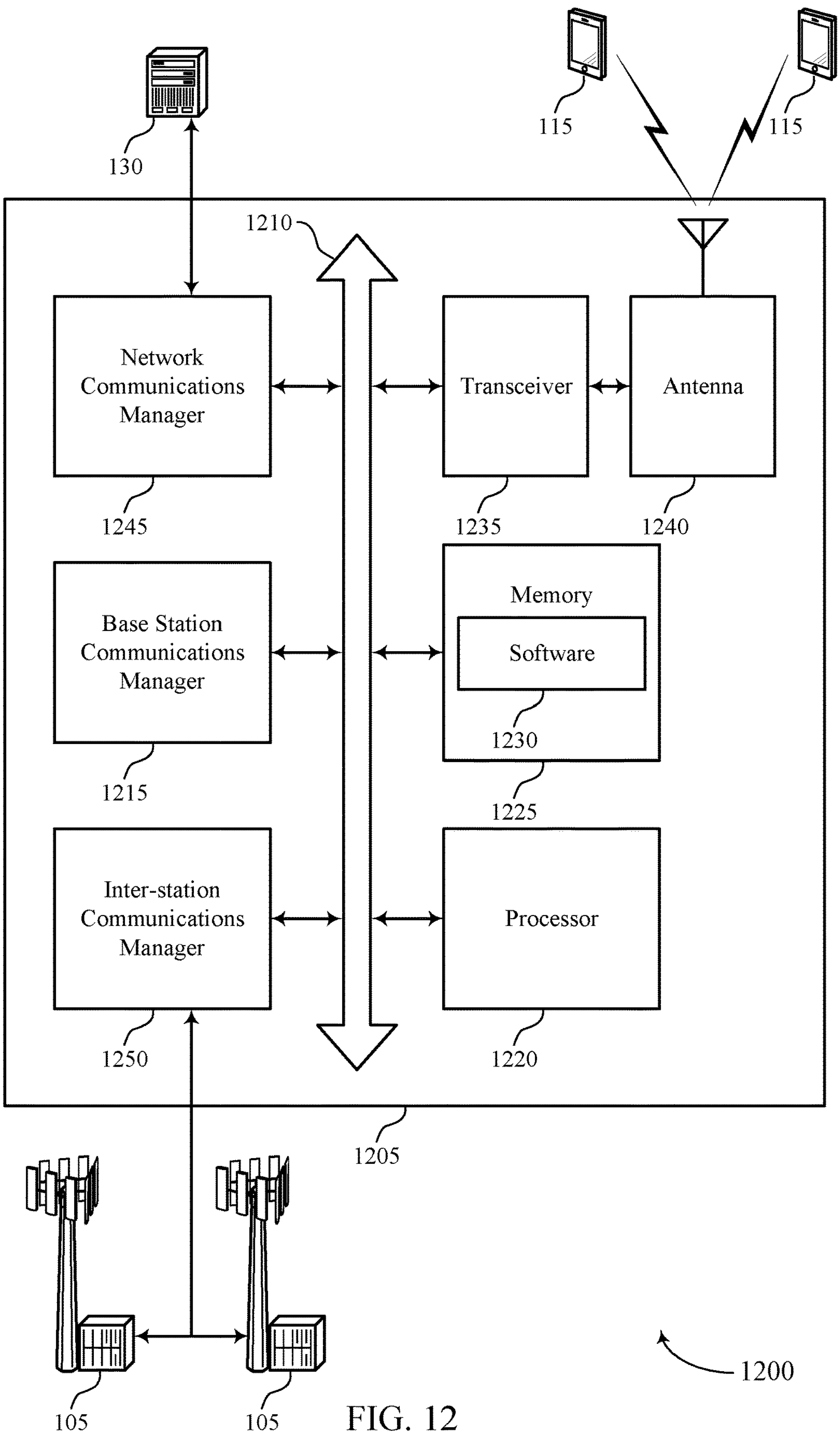
FIG. 12 illustrates a block diagram of a system including a base station that supports wireless communication in accordance with aspects of the present disclosure.

FIG. 12 shows a diagram of a system 1200 including a device 1205 that supports wireless communication in accordance with aspects of the present disclosure. Device 1205 may be an example of or include the components of base station as described herein. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting random access procedure with cross band downlink/uplink pairing).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support random access procedure with cross band downlink/uplink pairing. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
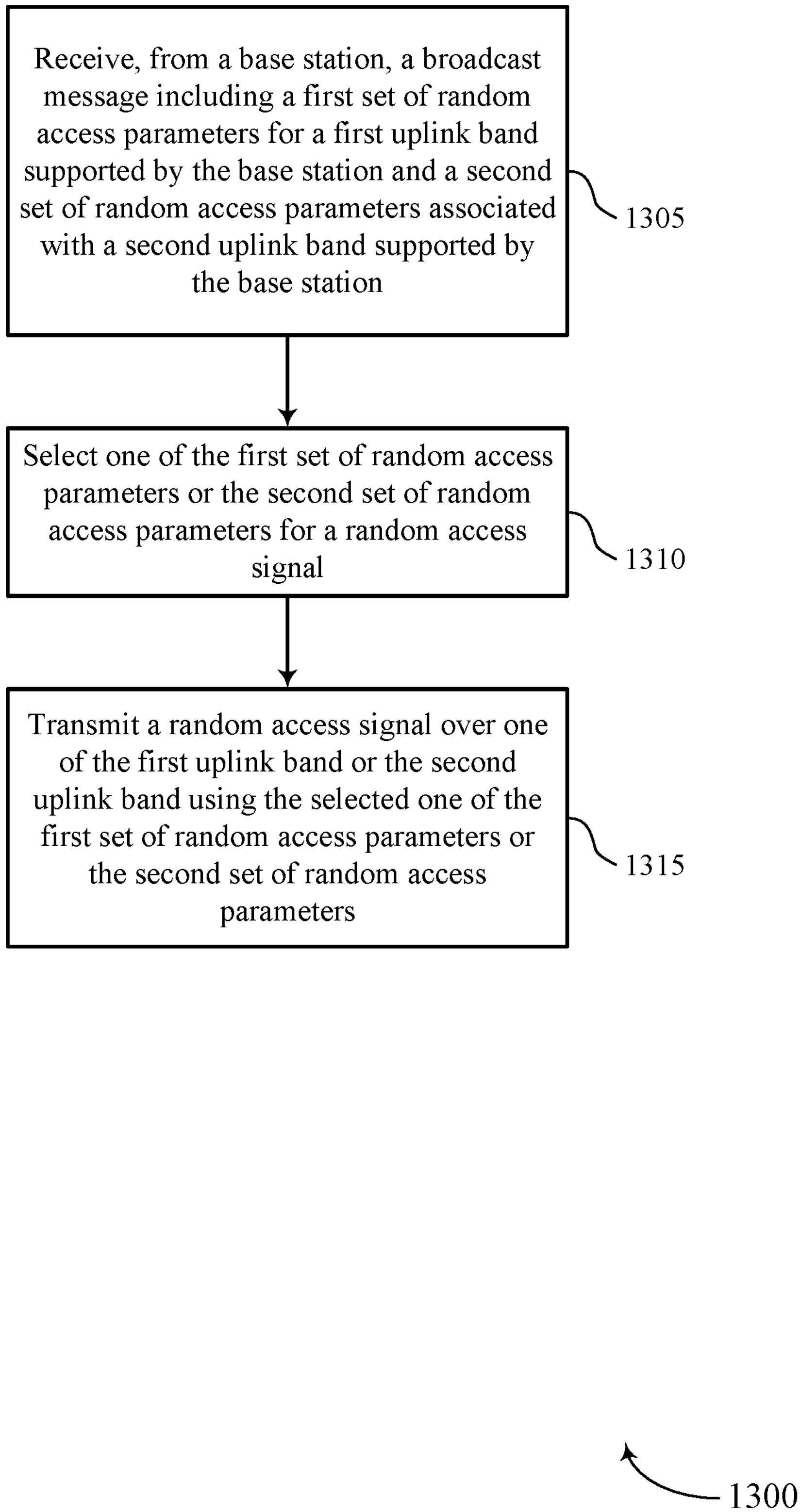
FIGS. 13 through 15 illustrate methods for wireless communication in accordance with aspects of the present disclosure.

FIG. 13 shows a flowchart illustrating a method 1300 for wireless communication in accordance with aspects of the present disclosure, including random access procedures with cross band downlink/uplink pairing. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive, from a base station, a broadcast message comprising a first set of random access parameters for a first uplink band supported by the base station and a second set of random access parameters associated with a second uplink band supported by the base station. The operations of block 1305 may be performed according to the methods described herein. In certain examples, aspects of the operations of block 1305 may be performed by a random access parameter indicator as described with reference to FIGS. 5 through 8.

At block 1310 the UE 115 may select one of the first set of random access parameters or the second set of random access parameters for a random access signal. The operations of block 1310 may be performed according to the methods described herein. In certain examples, aspects of the operations of block 1310 may be performed by a random access parameter selector as described with reference to FIGS. 5 through 8.

At block 1315 the UE 115 may transmit a random access signal over one of the first uplink band or the second uplink band using the selected one of the first set of random access parameters or the second set of random access parameters. The operations of block 1315 may be performed according to the methods described herein. In certain examples, aspects of the operations of block 1315 may be performed by a random access manager as described with reference to FIGS. 5 through 8.

Figure 14:
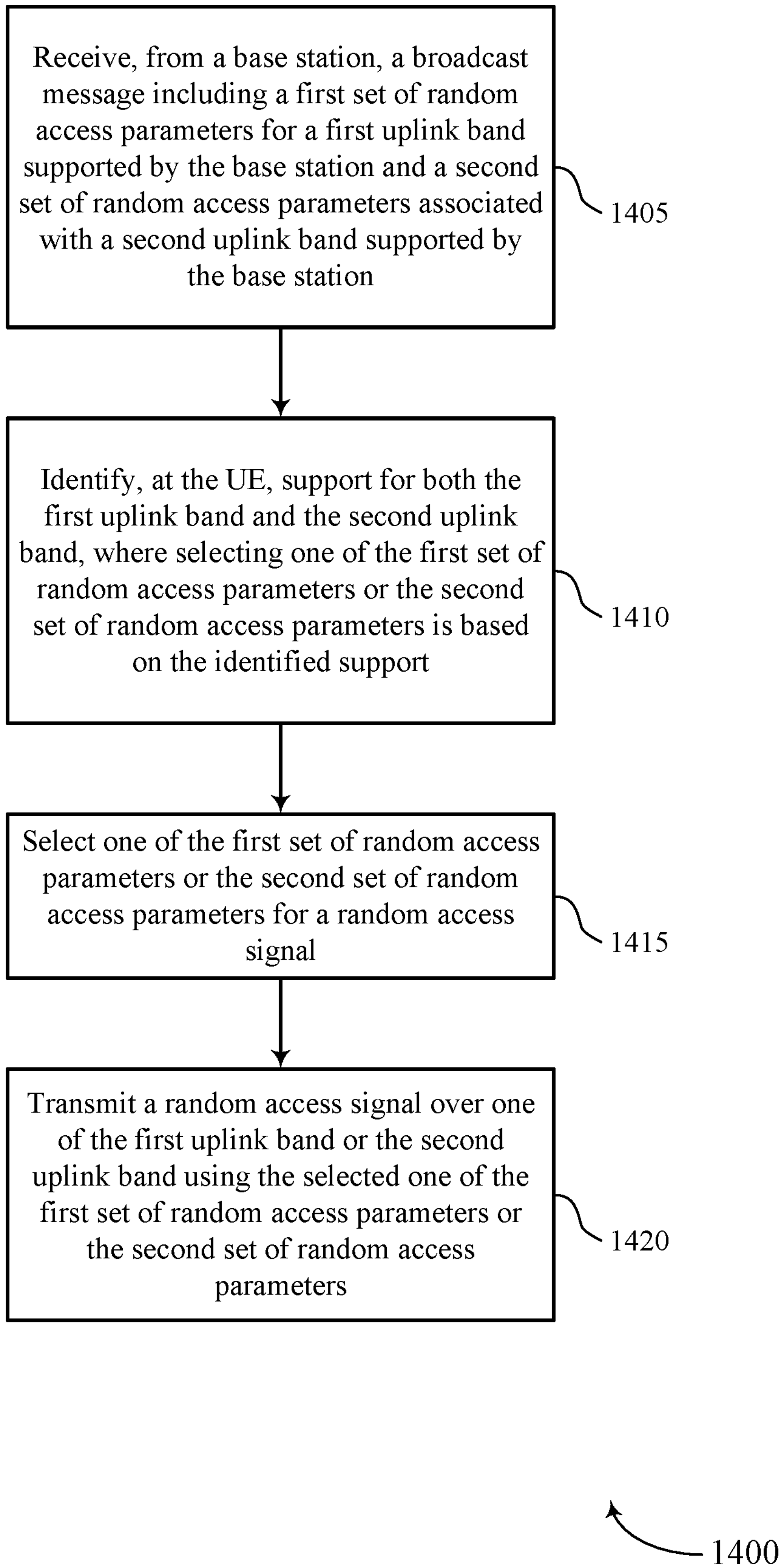

FIG. 14 shows a flowchart illustrating a method 1400 for wireless communication in accordance with aspects of the present disclosure, including random access procedures with cross band downlink/uplink pairing. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, from a base station, a broadcast message comprising a first set of random access parameters for a first uplink band supported by the base station and a second set of random access parameters associated with a second uplink band supported by the base station. The operations of block 1405 may be performed according to the methods described herein. In certain examples, aspects of the operations of block 1405 may be performed by a random access parameter indicator as described with reference to FIGS. 5 through 8.

At block 1410 the UE 115 may identify, at the UE, support for both the first uplink band and the second uplink band, wherein selecting one of the first set of random access parameters or the second set of random access parameters is based at least in part on the identified support. The operations of block 1410 may be performed according to the methods described herein. In certain examples, aspects of the operations of block 1410 may be performed by a support manager as described with reference to FIGS. 5 through 8.

At block 1415 the UE 115 may select one of the first set of random access parameters or the second set of random access parameters for a random access signal. The operations of block 1415 may be performed according to the methods described herein. In certain examples, aspects of the operations of block 1415 may be performed by a random access parameter selector as described with reference to FIGS. 5 through 8.

At block 1420 the UE 115 may transmit a random access signal over one of the first uplink band or the second uplink band using the selected one of the first set of random access parameters or the second set of random access parameters. The operations of block 1420 may be performed according to the methods described herein. In certain examples, aspects of the operations of block 1420 may be performed by a random access manager as described with reference to FIGS. 5 through 8.

Figure 15:
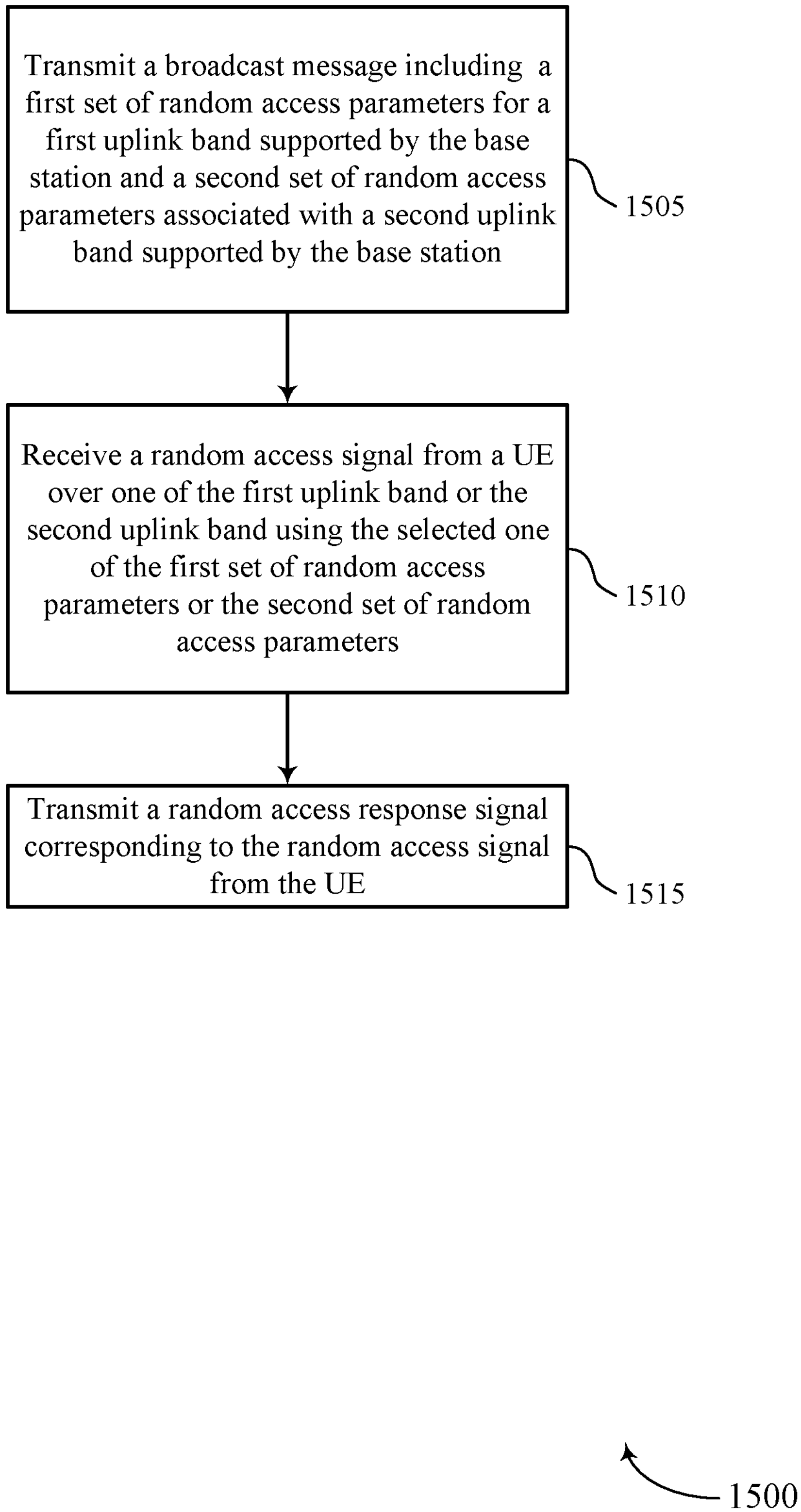

FIG. 15 shows a flowchart illustrating a method 1500 for wireless communication in accordance with aspects of the present disclosure, including random access procedures with cross band downlink/uplink pairing. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit a broadcast message comprising a first set of random access parameters for a first uplink band supported by the base station and a second set of random access parameters associated with a second uplink band supported by the base station. The operations of block 1505 may be performed according to the methods described herein. In certain examples, aspects of the operations of block 1505 may be performed by a random access parameter indicator as described with reference to FIGS. 9 through 12.

At block 1510 the base station 105 may receive a random access signal from a UE over one of the first uplink band or the second uplink band using the selected one of the first set of random access parameters or the second set of random access parameters. The operations of block 1510 may be performed according to the methods described herein. In certain examples, aspects of the operations of block 1510 may be performed by a random access manager as described with reference to FIGS. 9 through 12.

At block 1515 the base station 105 may transmit a random access response signal corresponding to the random access signal from the UE. The operations of block 1515 may be performed according to the methods described herein. In certain examples, aspects of the operations of block 1515 may be performed by a random access manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving a first synchronization signal block (SSB) associated with a first uplink band in a first broadcast signal or a second SSB associated with a second uplink band in a second broadcast signal, wherein the first uplink band comprises a millimeter wave band and the second uplink band comprises a sub-6 gigahertz band, and wherein the first broadcast signal comprises a first transmission metric that is different from a second transmission metric of the second broadcast signal;

selecting one of the first uplink band that comprises the millimeter wave band or the second uplink band that comprises the sub-6 gigahertz band for a random access signal based at least in part on the first SSB, the second SSB, the transmission metrics, and a received power level of the first SSB or the second SSB received over a downlink band satisfying a threshold for a downlink pathloss, wherein the downlink band comprises the millimeter wave band; and transmitting the random access signal over one of the first uplink band or the second uplink band based at least in part on the selecting.

2. The method of claim 1, further comprising:

identifying support for both the first uplink band and the second uplink band, wherein selecting one of the first uplink band or the second uplink band is based at least in part on the identified support; and selecting one of a first set of random access parameters for the first uplink band or a second set of random access parameters for the second uplink band based at least in part on the identified support.

3. The method of claim 2, further comprising:

determining that a channel performance on the downlink band is below the threshold, wherein the downlink band corresponds to the first uplink band, wherein selecting one of the first uplink band or the second uplink band is based at least in part on the determining.

4. The method of claim 2, further comprising:

determining that a transmission metric has exceeded a second threshold; and transmitting a subsequent random access signal over the second uplink band based at least in part on the determining.

5. The method of claim 4, wherein:

the subsequent random access signal comprises a random access preamble or a random access channel (RACH) message, wherein the RACH message comprises a RACH message 1 associated with a two-step RACH procedure or a RACH message 3 associated with a four-step RACH procedure.

6. The method of claim 2, further comprising:

transmitting uplink data over the second uplink band.

7. The method of claim 2, further comprising:

identifying a sync raster mapping between the first uplink band and the downlink band, the downlink band being a different band from the first uplink band; and receiving a downlink sync signal in the downlink band based at least in part on the sync raster mapping.

8. The method of claim 2, further comprising:

transmitting a subsequent random access signal over the second uplink band.

9. The method of claim 2, wherein:

the first set of random access parameters comprise one or more of a random access channel (RACH) location, a target received power, a nominal signal power for downlink measurements, or any combination thereof, for the first uplink band, and the second set of random access parameters comprise one or more of a RACH location, a target received power, a nominal signal power for downlink measurements, or any combination thereof, for the second uplink band.

10. The method of claim 1, wherein selecting one of the first uplink band or the second uplink band further comprises:

receiving the first SSB over the downlink band, wherein the downlink band corresponds to the first uplink band; and selecting the first uplink band to use to transmit the random access signal based at least in part on the received power level of the first SSB being below the threshold.

11. The method of claim 10, further comprising:

determining that the received power level of the first SSB is below the threshold based at least in part on receiving the first SSB.

12. The method of claim 10, further comprising:

measuring the received power level of the first SSB based at least in part on receiving the first SSB, wherein selecting to use the first uplink band is based at least in part on measuring the received power level.

13. The method of claim 1, wherein transmitting the random access signal comprises transmitting the random access signal over the first uplink band based at least in part on the received power level of the first SSB being below the threshold, wherein the downlink band corresponds to the first uplink band.

14. The method of claim 1, further comprising:

selecting the first uplink band to use to transmit the random access signal based at least in part on the received power level of the first SSB being below the threshold, wherein the downlink band corresponds to the first uplink band, wherein transmitting the random access signal is based at least in part on selecting the first uplink band.

15. The method of claim 1, wherein the first transmission metric and the second transmission metric comprise at least one of a transmit power level, a beamforming configuration, a time resource, a frequency resource, a time-frequency resource, or any combination thereof.

16. A method for wireless communication, comprising:

transmitting a first synchronization signal block (SSB) associated with a first uplink band in a first broadcast signal or a second SSB associated with a second uplink band in a second broadcast signal, wherein the first uplink band comprises a millimeter wave band and the second uplink band comprises a sub-6 gigahertz band, and wherein the first broadcast signal comprises a first transmission metric that is different from a second transmission metric of the second broadcast signal;

receiving a random access signal from a user equipment (UE) over one of the first uplink band or the second SSB associated with the second uplink band based at least in part on the first SSB, the second SSB, the transmission metrics, and a received power level of the first SSB or the second SSB transmitted over a downlink band satisfying a threshold for a downlink pathloss, wherein the downlink band comprises the millimeter wave band; and transmitting a random access response signal corresponding to the random access signal from the UE.

17. The method of claim 16 further comprising:

receiving a subsequent random access signal over the second uplink band based at least in part on a transmission metric exceeding a second threshold, wherein the transmission metric exceeding the second threshold is determined by the UE.

18. The method of claim 16, further comprising:

receiving uplink data from the UE over the second uplink band.

19. The method of claim 16, further comprising:

transmitting the first SSB or the second SSB over a first downlink band based at least in part on a sync raster mapping between the first uplink band and a second downlink band, the first downlink band being a different band from the first uplink band, wherein the sync raster mapping is determined by the UE.

20. The method of claim 16, further comprising:

receiving a subsequent random access signal over the second uplink band.

21. The method of claim 16, wherein the first transmission metric and the second transmission metric comprise at least one of a transmit power level, a beamforming configuration, a time resource, a frequency resource, a time-frequency resource, or any combination thereof.

22. The method of claim 16, wherein:

a first set of random access parameters for the first uplink band comprise one or more of a random access channel (RACH) location, a target received power, a nominal signal power for downlink measurements, or any combination thereof, for the first uplink band, and second set of random access parameters for the second uplink band comprise one or more of a RACH location, a target received power, a nominal signal power for downlink measurements, or any combination thereof, for the second uplink band.

23. The method of claim 16, wherein selecting one of the first uplink band or the second uplink band further comprises:

transmitting the first SSB over the downlink band, wherein the downlink band corresponds to the first uplink band, wherein receiving the random access signal over the first uplink band is based at least in part on the received power level of the first SSB being below the threshold.

24. The method of claim 16, wherein receiving the random access signal comprises receiving the random access signal over the first uplink band based at least in part on the received power level of the first SSB being below the threshold, wherein the downlink band corresponds to the first uplink band.

25. An apparatus for wireless communication, comprising:

a processor;

memory coupled with the processor; and instructions stored in the memory and operable, when executed by the processor, to cause the apparatus to:

receive a first synchronization signal block (SSB) associated with a first uplink band in a first broadcast signal or a second SSB associated with a second uplink band in a second broadcast signal, wherein the first uplink band comprises a millimeter wave band and the second uplink band comprises a sub-6 gigahertz band, and wherein the first broadcast signal comprises a first transmission metric that is different from a second transmission metric of the second broadcast signal;

select one of the first uplink band that comprises the millimeter wave band or the second uplink band that comprises the sub-6 gigahertz band for a random access signal based at least in part on the first SSB, the second SSB, the transmission metrics, and a received power level of the first SSB or the second SSB received over a downlink band satisfying a threshold for a downlink pathloss, wherein the downlink band comprises the millimeter wave band; and transmit the random access signal over one of the first uplink band or the second uplink band based at least in part on the selecting.

26. The apparatus of claim 25, wherein the instructions are further executable by the processor to:

identify support for both the first uplink band and the second uplink band, wherein selecting one of the first uplink band or the second uplink band is based at least in part on the identified support; and selecting one of a first set of random access parameters for the first uplink band or a second set of random access parameters for the second uplink band based at least in part on the identified support.

27. The apparatus of claim 26, wherein the instructions are further executable by the processor to:

determine that a channel performance on the downlink band is below the threshold, wherein the downlink band corresponds to the first uplink band, wherein to select one of the first uplink band or the second uplink band is based at least in part on the determining.

28. The apparatus of claim 26, wherein the instructions are further executable by the processor to:

determine that a transmission metric has exceeded a second threshold; and transmit a subsequent random access signal over the second uplink band based at least in part on the determining.

29. An apparatus for wireless communication, comprising:

a processor;

memory coupled with the processor; and instructions stored in the memory and operable, when executed by the processor, to cause the apparatus to:

transmit a first synchronization signal block (SSB) associated with a first uplink band in a first broadcast signal or a second SSB associated with a second uplink band in a second broadcast signal, wherein the first uplink band comprises a millimeter wave band and the second uplink band comprises a sub-6 gigahertz band, and wherein the first broadcast signal comprises a first transmission metric that is different from a second transmission metric of the second broadcast signal;

receive a random access signal from a user equipment (UE) over one of the first uplink band or the second uplink band based at least in part on the first SSB, the second SSB, the transmission metrics, and a received power level of the first SSB or the second SSB transmitted over a downlink band satisfying a threshold for a downlink pathloss, wherein the downlink band comprises the millimeter wave band; and transmit a random access response signal corresponding to the random access signal from the UE.

* * * * *